(12) United States Patent
Nakade et al.

(10) Patent No.: US 12,380,698 B2
(45) Date of Patent: Aug. 5, 2025

(54) INFORMATION PROCESSING TERMINAL AND REMOTE CONTROL METHOD

(71) Applicant: MAXELL, LTD., Kyoto (JP)

(72) Inventors: Mayumi Nakade, Kyoto (JP); Tamotsu Ito, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/011,879

(22) PCT Filed: Jul. 8, 2020

(86) PCT No.: PCT/JP2020/026710
§ 371 (c)(1),
(2) Date: Dec. 21, 2022

(87) PCT Pub. No.: WO2022/009338
PCT Pub. Date: Jan. 13, 2022

(65) Prior Publication Data
US 2023/0245456 A1 Aug. 3, 2023

(51) Int. Cl.
*G06V 20/50* (2022.01)
*G06F 3/01* (2006.01)
(Continued)

(52) U.S. Cl.
CPC .............. *G06V 20/50* (2022.01); *G06F 3/011* (2013.01); *G06T 11/00* (2013.01); *G06V 20/20* (2022.01); *G08C 17/02* (2013.01)

(58) Field of Classification Search
CPC .................................................. G08C 2201/93
See application file for complete search history.

(56) References Cited

U.S. PATENT DOCUMENTS

| 11,328,692 B2 * | 5/2022 | Cartier ................... H04R 1/028 |
| 2006/0066573 A1 * | 3/2006 | Matsumoto ........... G06F 3/0236 345/158 |

(Continued)

FOREIGN PATENT DOCUMENTS

| JP | 09-018971 A | 1/1997 |
| JP | 2007-511128 A | 4/2007 |

(Continued)

OTHER PUBLICATIONS

International Search Report of PCT/JP2020/026710 dated Oct. 6, 2020.

(Continued)

*Primary Examiner* — William Boddie
*Assistant Examiner* — Bipin Gyawali
(74) *Attorney, Agent, or Firm* — Mattingly & Malur, PC

(57) ABSTRACT

An information processing terminal including a communication device, which transmits a control command to a controlled device via the communication device to remotely control the controlled device, comprises: a virtual remote control generator configured to identify the controlled device and a desired control operation that is a control operation desired to be performed from a surrounding image which is an image around the information processing terminal, and generate an acceptance object for accepting an operation instruction to the desired control operation from a user; an operation acceptance section configured to accept the operation instruction from the user via the acceptance object; and a command transmitter configured to transmit the control command corresponding to the operation instruction accepted by the operation acceptance section to the controlled device.

12 Claims, 16 Drawing Sheets

(51) Int. Cl.
*G06T 11/00* (2006.01)
*G06V 20/20* (2022.01)
*G08C 17/02* (2006.01)

(56) References Cited

U.S. PATENT DOCUMENTS

| | | | |
|---|---|---|---|
| 2007/0080845 A1 | 4/2007 | Amand | |
| 2007/0180400 A1* | 8/2007 | Zotov | G06F 3/04845 |
| | | | 715/788 |
| 2008/0297372 A1 | 12/2008 | Wouters et al. | |
| 2012/0105447 A1* | 5/2012 | Kim | G06V 20/20 |
| | | | 345/419 |
| 2012/0119998 A1 | 5/2012 | Sato | |
| 2012/0280802 A1 | 11/2012 | Yoshida et al. | |
| 2014/0361988 A1* | 12/2014 | Katz | G06T 7/70 |
| | | | 345/156 |
| 2015/0261484 A1* | 9/2015 | Wang | G06F 3/1287 |
| | | | 358/1.15 |
| 2015/0364037 A1* | 12/2015 | Lee | H04N 23/66 |
| | | | 348/158 |
| 2017/0206779 A1* | 7/2017 | Lee | G08C 17/02 |
| 2017/0339231 A1* | 11/2017 | Lee | G08C 17/02 |
| 2018/0158316 A1* | 6/2018 | Ham | G08C 17/02 |
| 2018/0276474 A1* | 9/2018 | Ren | H04N 21/42202 |
| 2018/0332049 A1* | 11/2018 | Zhang | H04W 12/084 |
| 2019/0132436 A1* | 5/2019 | Jang | H04M 1/72415 |
| 2021/0020027 A1* | 1/2021 | Son | G08C 17/02 |

FOREIGN PATENT DOCUMENTS

| | | |
|---|---|---|
| JP | 2009-517949 A | 4/2009 |
| JP | 2012-105131 A | 5/2012 |
| JP | 2013-172432 A | 9/2013 |
| JP | 2016-24519 A | 2/2016 |
| WO | 2012/132171 A1 | 10/2012 |

OTHER PUBLICATIONS

Japanese Office Action received in corresponding Japanese Application No. 2024-106510 dated Mar. 25, 2025.

* cited by examiner

| DESCRIPTION CONTENT | ANALYSIS CONTENT | DESCRIPTION TYPE |
|---|---|---|
| AIR CONDITIONER<br>A/C<br>etc. | AIR CONDITIONING DEVICE | CONTROLLED DEVICE |
| cooling<br>cool<br>COOLING<br>COOL<br>etc. | TURN ON COOLING FUNCTION | DESIRED CONTROL OPERATION |
| stop<br>sto<br>STOP<br>STO<br>etc. | STOP | DESIRED CONTROL OPERATION |
| heating<br>heat<br>HEATING<br>HEAT<br>etc. | TURN ON HEATING FUNCTION | DESIRED CONTROL OPERATION |
| dehumidify<br>dehumidi<br>DEHUMIDIFY<br>DEHUMIDI<br>etc. | TURN ON DEHUMIDIFYING FUNCTION | DESIRED CONTROL OPERATION |
| LIGHT<br>light<br>ILLUMINATION<br>illumination<br>LAMP<br>etc | LIGHTING FIXTURE | CONTROLLED DEVICE |
| ⋮ | ⋮ | ⋮ |

| CONTROLLED DEVICE NAME | ID | CONTROL DATA | DETAILED INFORMATION |
|---|---|---|---|
| AIR CONDITIONING DEVICE | #001 | | |
| AIR CONDITIONING DEVICE | #002 | | |
| AIR CONDITIONING DEVICE | #003 | | |
| LIGHTING FIXTURE | #101 | | |
| ⋮ | ⋮ | ⋮ | ⋮ |

| DESCRIPTION TYPE | ANALYSIS CONTENT | ID | CONTROL COMMAND | AREA | DISPLAY DATA |
|---|---|---|---|---|---|
| CONTROLLED DEVICE | AIR CONDITIONING DEVICE | #001 | | 01 | AIR CONDITIONER |
| DESIRED CONTROL OPERATION | COOLING FUNCTION BUTTON | | ····· | 02 | COOLING |
| DESIRED CONTROL OPERATION | STOP FUNCTION BUTTON | | ····· | 03 | STOP |
| ⋮ | ⋮ | | | | |

253a  253b  253c  253d  253e  253f

CREATION DATE AND TIME :

| GESTURE ACTION | OPERATION INSTRUCTION |
|---|---|
| TOUCH FUNCTION BUTTON | EXECUTE FUNCTION |
| SLIDING FUNCTION BUTTON WITHIN FUNCTION BUTTON DISPLAY AREA WHILE PRESSING | MOVE FUNCTION BUTTON |
| SLIDING FUNCTION BUTTON TOWARD OUT OF FUNCTION BUTTON DISPLAY AREA WHILE PRESSING | ERASE FUNCTION BUTTON |
| DRAW ARC TO SURROUND ENTIRE FUNCTION BUTTON GROUP | SELECT FUNCTION BUTTON |
| MOVE HAND LATERALLY | TERMINATE DISPLAYING OF FUNCTION BUTTON |
| ⋮ | ⋮ |

FIG. 15
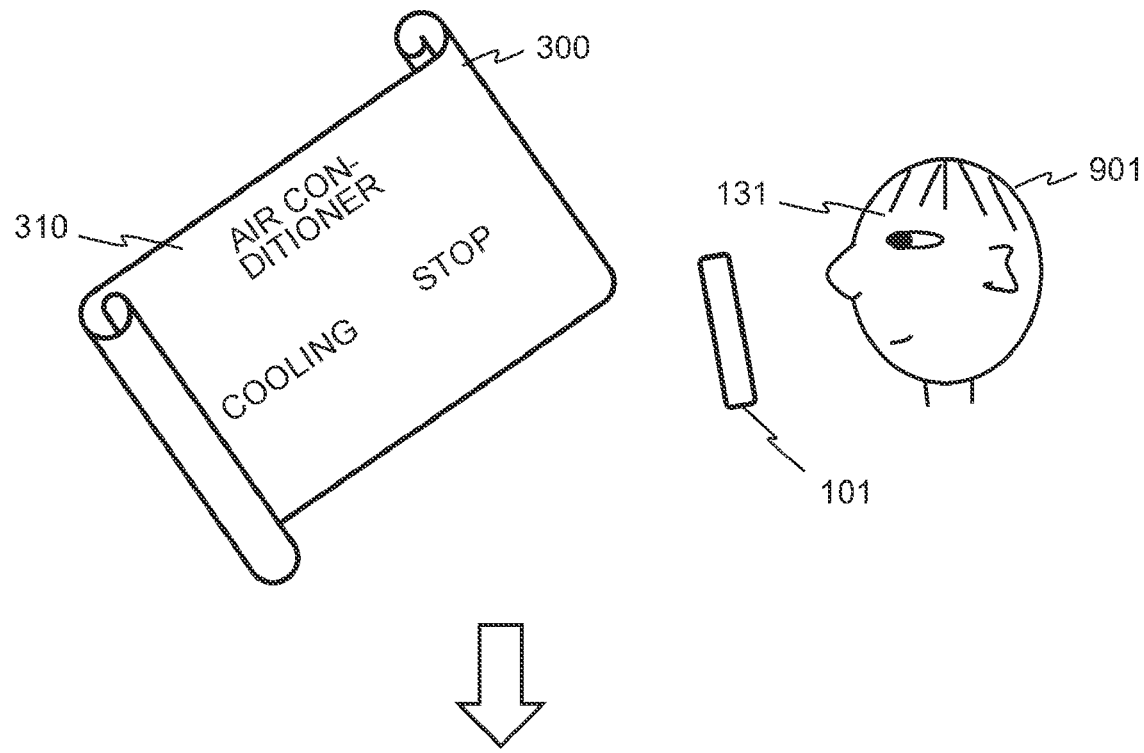
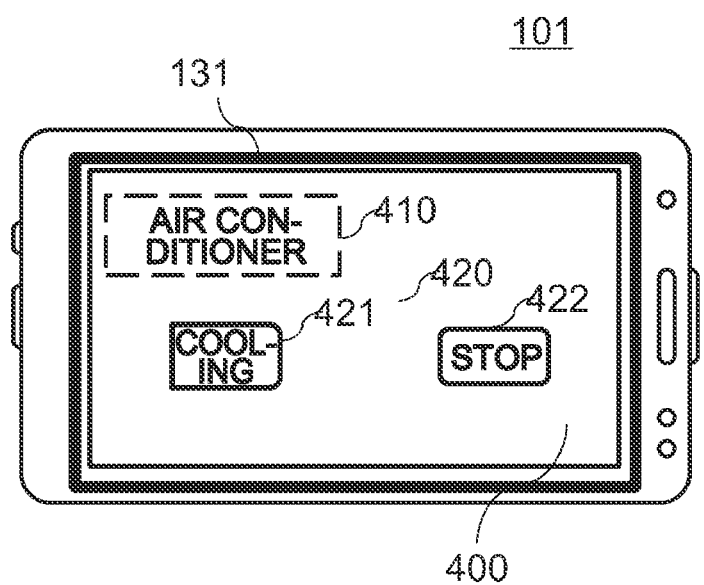

INFORMATION PROCESSING TERMINAL AND REMOTE CONTROL METHOD

TECHNICAL FIELD

The present invention relates to a remote control technique for remote control using a mobile information terminal.

BACKGROUND ART

As a mobile information terminal, a head-mounted display (hereinafter, referred to as "HMD") having the shape of eyeglasses is known. The HMD superimposes a video of the real space and an image (AR object such as an avatar) of augmented reality (AR) generated by a computer on a display screen of an eyeglass portion, and displays it thereon.

Recently, more and more devices have been controlled by remote controllers (hereinafter, referred to as "remote controls"). In response to this trend, remote controllers such as learning remote controls in which various remote control functions are integrated (storing various remote control functions and operating them) and smart remote controls (managing operations of devices using internet communication such as Wi-Fi or wireless LAN) have been commonly used. For example, Patent Literature 1 discloses a remote control system that establishes a wireless link by directing a general-purpose remote control having directivity toward the appliance to be controlled, and remotely operates the appliance to be controlled using the general-purpose remote control that has received an operating application transmitted from the appliance to be controlled.

CITATION LIST

Patent Literature

Patent Literature 1: WO-2012-132171

SUMMARY OF INVENTION

Technical Problem

According to the technique of Patent Literature 1, a user is allowed to select an appliance to be remotely controlled by simply directing a general-purpose remote control toward the appliance, and remotely operate the appliance selected using the general-purpose remote control. However, interfaces of, not only general-purpose remote controls but also existing remote controls are not necessarily user-friendly since, for example, function buttons of the functions that are not normally used are included, or arrangement of the function buttons are not preferable for the user. Furthermore, even in the case of a general-purpose remote control, inconvenience of finding it cannot be avoided.

The present invention has been made in view of the circumstances above, and an object of the present invention is to provide a remote control technique for eliminating the inconvenience of finding a remote control and greatly improving the convenience of a user.

Solution to Problem

The present invention provides an information processing terminal including a communication device, which transmits a control command to a controlled device via the communication device to remotely control the controlled device, the information processing terminal comprising: a virtual remote control generator configured to identify the controlled device and a desired control operation that is a control operation desired to be performed from a surrounding image which is an image around the information processing terminal, and generate an acceptance object for accepting an operation instruction to the desired control operation as from a user; an operation acceptance section configured to accept the operation instruction from the user via the acceptance object; and a command transmitter configured to transmit the control command corresponding to the operation instruction accepted by the operation acceptance section to the controlled device.

Advantageous Effects of Invention

According to the present invention, a remote control technique for eliminating the inconvenience of finding a remote control and greatly improving the convenience of a user is provided. The problems, configurations, and advantageous effects other than those described above will be clarified by an embodiment to be described later.

BRIEF DESCRIPTION OF DRAWINGS

FIG. 6 is a diagram for explaining an example of an analysis table according to the embodiment of the present invention.

FIG. 7(a) is a diagram for explaining an example of a control data table according to the embodiment of the present invention, and FIG. 7(b) is a diagram for explaining an example of a remote control table according to the embodiment of the present invention.

FIG. 8 is a diagram for explaining an example of a gesture action table according to the embodiment of the present invention.

FIG. 15 is a diagram for explaining an outline of a modification according to the present invention.

DESCRIPTION OF EMBODIMENTS

Hereinafter, an embodiment of the present invention will be descried with reference to the drawings.

An embodiment of the present invention will be described with reference to the drawings. Before describing the configuration according to the present embodiment, an outline of the present embodiment will be explained. Hereinafter, in the specification and drawings, the same features will be provided with the same reference signs.

The present embodiment is provided, for example, considering the use by an elderly user that easily loses a remote controller (remote control; remote control device). Elderly users not only easily lose remote controls, but also often bothered by many buttons provided on existing remote controls. In the present embodiment, in order to solve the problems described above, for example, through a simple operation of handwriting minimum necessary control operations on a suitable paper at any time, a user can use the written paper as if it was a real remote control.

Figure 1:
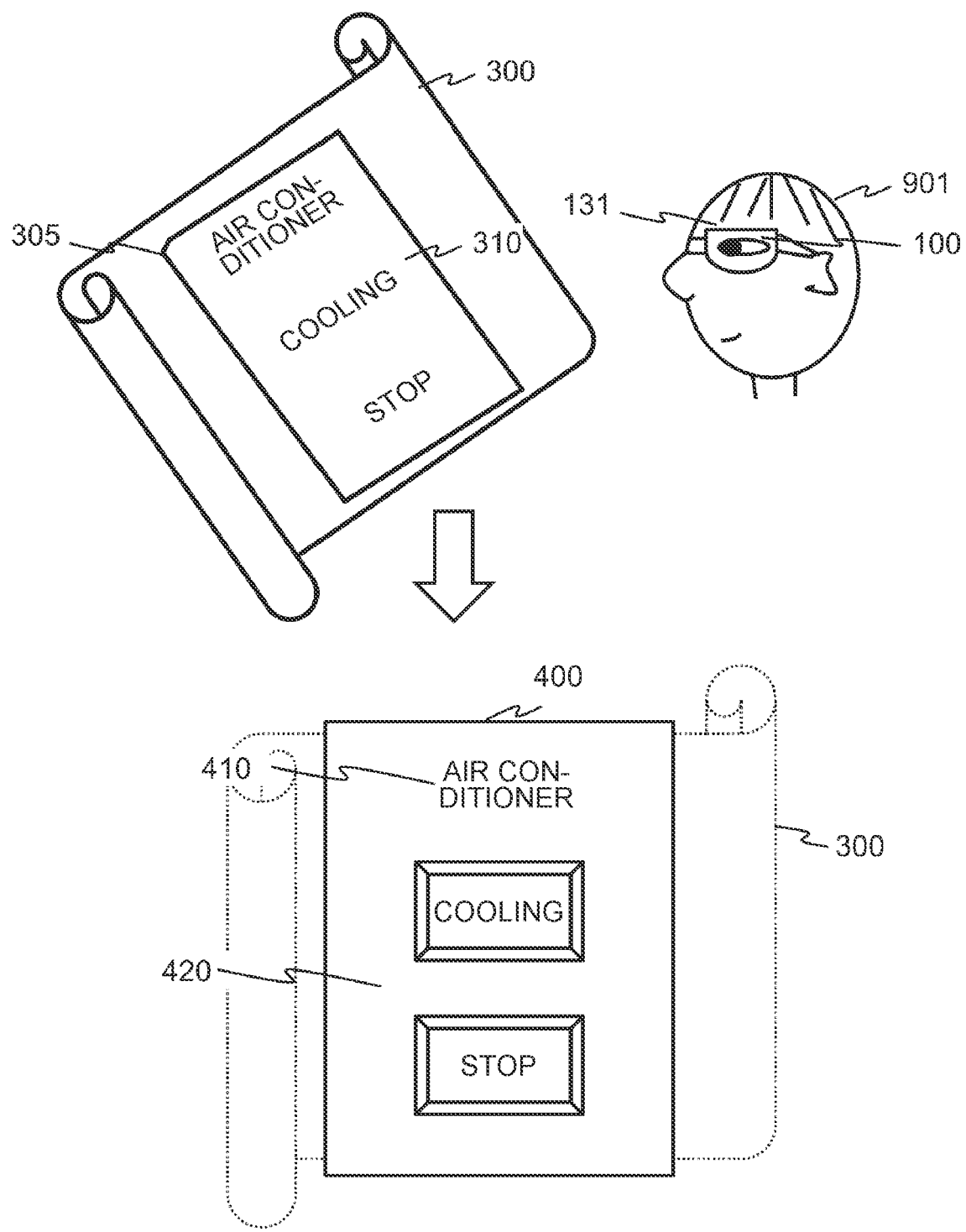
FIG. 1 is a diagram for explaining an outline according to an embodiment of the present invention.

FIG. 1 is a diagram for explaining an outline of the present embodiment. In the present embodiment, a user 901 wearing the HMD (head-mounted display) 100 prepares a paper or the like in which a name of a device to be operated (controlled device) and a control operation desired to be performed (desired control operation) are written. Hereinafter, the paper including the information is referred to as a presentation surface 300, and the written information is referred to as description information 310.

The HMD 100 generates, as a virtual remote control image 400, the functions of a remote control of the controlled device based on the description information 310 of the presentation surface 300 looked at by the user 901 through a display 131. Then, the HMD 100 accepts an operation performed onto the presentation surface 300 by the user 901 as an operation to the virtual remote control image 400, and operates the controlled device.

In order to generate the virtual remote control image 400, the HMD 100 reads the description information 310 on the presentation surface 300 and associates it with a control command of the controlled device. The generated virtual remote control image 400 may be displayed on the display 131 of the HMD 100. For example, the desired control operation written on the presentation surface 300 may be displayed on the display 131 of the HMD 100 as a function button (acceptance object) when being recognized. Then, the user 901 performs an operation, for example, through gestures to provide the function button with an instruction, whereby the controlled device is controlled.

The presentation surface 300 may be, for example, a sheet-like member such as the paper described above. The description information 310 may be handwritten. However, the presentation surface 300 and the description information 310 are not limited thereto.

Thus, according to the present embodiment, the user 901 can operate the controlled device as if the presentation surface 300 prepared by himself or herself was used as a remote controller.

[System Configuration]

Figure 2:
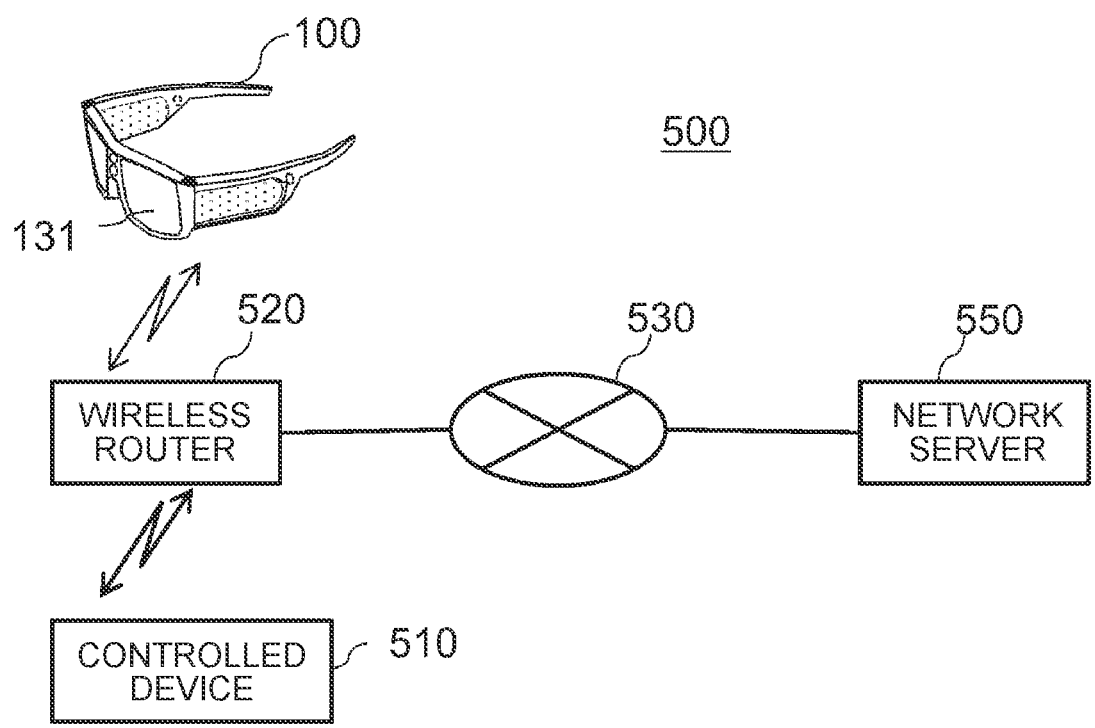
FIG. 2 is a system configuration diagram of a remote control system according to the embodiment of the present invention.

Hereinafter, firstly, a system configuration of a remote control system 500 according to the present embodiment for realizing the above will be described. FIG. 2 is a system configuration diagram of the remote control system 500 according to the present embodiment.

As illustrated in FIG. 2, the remote control system 500 according to the present embodiment includes the HMD 100, a controlled device 510, a wireless router 520, and a network server 550.

The wireless router 520 is connected to the network server 550 via a network 530. The HMD 100 is connected to the network server 550 via the wireless router 520.

The controlled device 510 is connected to the wireless router 520 via wired LAN or wireless LAN. The HMD 100 transmits a control command to the controlled device 510 via the wireless router 520.

In the present embodiment, the configuration above allows the user 901 wearing the HMD 100 to remotely control the controlled device 510.

The network server 550 is an external server that retains control data for controlling the controlled device 510. The network server 550 transmits the control data on the controlled device 510 that has been requested from the HMD 100 via the wireless router 520 and the network 530 to the transmission source HMD 100 via the network 530 and the wireless router 520.

Note that one exemplary network server 550 is described herein, however, the number of network servers is not limited thereto. For example, a manufacturer of the controlled device 510 may provide the network server 550. Furthermore, the network server 550 is not always necessary. After acquiring necessary information from the network server 550, the HMD 100 controls the controlled device 510 by communication among the HMD 100, the wireless router 520, and the controlled device 510.

The controlled device 510 is a device that the user 901 wearing the HMD 100 wants to control using a remote control. For example, the controlled device 510 is an appliance such as an air conditioner, lighting fixture, TV, and fan, and household equipment to which a home energy management system (HEMS) that is an energy management system for household use can be applied, such as a gas-water heater and an underfloor heater. Hereinafter, the present embodiment will be described referring to an example in which the controlled device 510 is an air conditioner. Note that it is assumed that the air conditioner is an air conditioner for household use.

The HMD 100 is a device that is worn on the head of the user 901 and displays the processed information on the display 131. The HMD 100 according to the present embodiment has the eyeglasses or goggles shape, and includes the display 131 at the positions of lenses of the eyeglasses. The display 131 may be transparent or non-transparent.

The HMD 100 allows the user 901 to observe the situation of the real space through the display 131. In addition, the HMD 100 can display AR objects of the augmented reality on the display 131. This enables the user 901 to simultaneously view both an AR object displayed on the display 131 and the situation of the real space.

[HMD]

Next, a hardware configuration and functional blocks of the HMD 100 according to the present embodiment will be described with reference to the drawings.

[Hardware Configuration]

Figure 3:
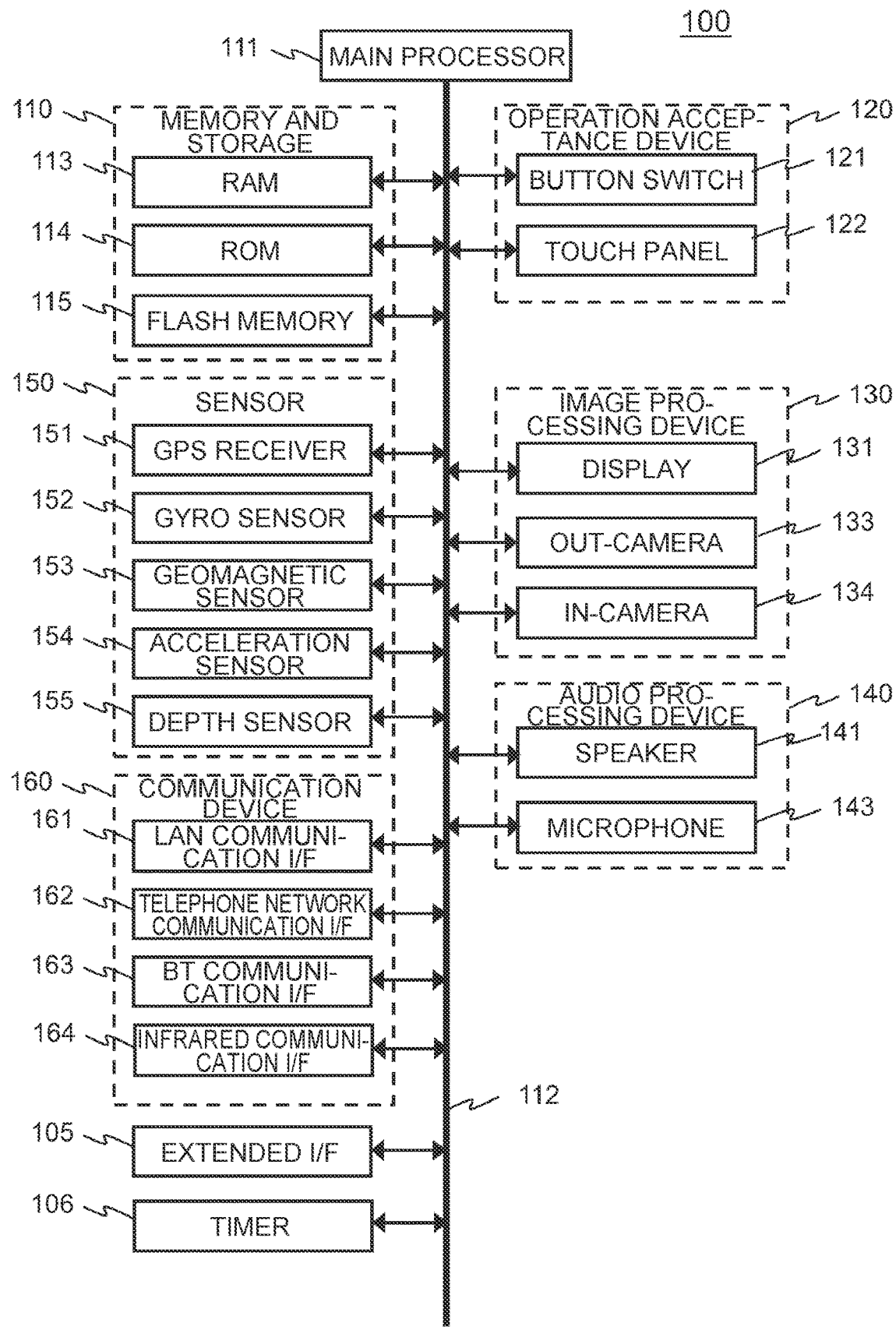
FIG. 3 is a hardware configuration diagram of an HMD according to the embodiment of the present invention.

Hereinafter, a hardware configuration of the HMD 100 according to the present embodiment for realizing the processing described above will be explained. FIG. 3 is a block diagram illustrating an exemplary configuration of the HMD 100 according to the present embodiment. In FIG. 3, the same components as those illustrated in FIG. 1 and FIG. 2 are provided with the same reference signs.

As illustrated in FIG. 3, the HMD 100 according to the present embodiment includes a main processor 111, a system bus 112, a memory and storage 110, an operation acceptance device 120, an image processing device 130, an audio processing device 140, a sensor 150, a communication device 160, an extended I/F (interface) 105, and a timer 106.

The main processor 111 is a main controller that controls the overall operations of the HMD 100 in accordance with a predetermined program. The main processor 111 is implemented by a CPU (Central Processor Unit) or a microprocessor unit (MPU). The main processor 111 executes programs such as an operating system (OS) and various operation control applications stored in the memory and storage 110 so as to perform processing for controlling the overall operations of the HMD 100. Furthermore, the main processor 111 controls operations of starting various applications. The main processor 111 performs the processing in accordance with a clock signal measured and output by the timer 106.

The system bus 112 is a data communication path for transmitting and receiving data between the main processor 111 and each section provided in the HMD 100.

The memory and storage 110 includes a RAM 113, a ROM 114, and a flash memory 115. The memory and storage 110 retains programs such as an operating system and various operation control applications for music, images, documents, and the like. In addition, information data such as base data necessary for basic operations performed by the operating system and file data started by various applications are stored in the memory and storage 110. For example, when a user starts a music application installed in the HMD 100 and selects music file data, the HMD 100 plays the file data of the selected music, thereby allowing the user to listen to the desired music.

The RAM 113 is a program area during execution of a basic operation program or other application programs. The RAM 113 is a temporary storage area for temporarily retaining data as necessary during execution of various application programs. The RAM 113 may be integrated with the main processor 111.

Each of the ROM 114 and the flash memory 115 retains various programs for realizing the functions of the HMD 100, operation setting values, sensor information including values detected by the sensor 150 which will be described later, and various kinds of data for display such as virtual objects and content.

The flash memory 115 retains operation programs downloaded from the network 530 and various kinds of data created by the operation programs. Through download processing from each server device on the network 530, each of the operation programs stored in the flash memory 115 can be updated and enhanced.

Furthermore, the flash memory 115 can retain content such as moving images, still images, and sounds downloaded from the network 530. In addition, the flash memory 115 can retain data such as moving images and still images captured by an in-camera 134 or an out-camera 133.

The ROM 114 and flash memory 115 are so-called nonvolatile storages that retain stored data even when power is not supplied to the HMD 100 from the outside. Hereinafter, the ROM 114 and the flash memory 115 are collectively referred to as an internal memory storage when there is no need to distinguish them from each other. The main controller 111 loads new application programs stored in the internal memory storage onto the RAM 113 and executes them, whereby the HMD 100 can realize the various functions.

The internal memory storage needs to hold stored information even while the HMD 100 is not being supplied with power. Accordingly, as the internal memory storage, a device such as a flash ROM, a solid-state drive (SSD), or a hard disc drive (HDD) is used.

The operation acceptance device 120 accepts input of an operation instruction to the HMD 100. In the present embodiment, the operation acceptance device 120 includes a button switch 121 and a touch panel 122. The button switch 121 includes, for example, a power key, a volume key, and a home key. The touch panel 122 accepts an operation instruction via a touch pad. Note that the HMD 100 according to the present embodiment does not necessarily have to include all the elements of the operation acceptance device 120. The HMD 100 may accept an operation instruction to the HMD 100 via a separate information processing terminal device connected thereto by wired communication or wireless communication.

The operation acceptance device 120 may be provided at a position or in a form allowing the user 901 to easily perform an input operation to the HMD 100. The operation acceptance device 120 may be separated from the main body of the HMD 100 and connected thereto by wired or wireless communication. Alternatively, the operation acceptance device 120 may be configured to function using the line of sight of the user 901. In this case, for example, displaying an input operation screen on the display 131 and capturing a position on the input operation screen to which the line of sight of the user 901 detected by the in-camera 134, which will be described later, is directed enables acquisition of the input operation information.

Alternatively, displaying a pointer on the input operation screen and operating it also enables the acquisition of the input operation information. The input operation information may be captured by collecting voices uttered by the user 901 which express an input operation with a microphone 143 which will be described later.

The image processing device 130 is an image (video) processor, and includes the display 131, the out-camera 133, and the in-camera 134.

The display 131 is, for example, a display device (display) such as a liquid crystal panel, and provides a user of the HMD 100 with image data processed by an image signal processor. The display 131 includes a left-eye display and a right-eye display. The display 131 may be a transparent type (optical see-through) display or a non-transparent type (video see-through) display.

The optical see-through display includes a projection unit that projects various kinds of information such as playing information by applications which have been active and notification information to the user 901, and a transparent half mirror that forms and displays projected various kinds of information in front of the eyes. The video see-through display includes a liquid crystal panel or the like that displays an image of a real space object in front of the eye captured by the out-camera 133 together with various kinds of information. The display 131 allows the user 901 to view not only images within the field of view in front of the eye, but also playing information about music, images, documents, and the like by the active applications.

The image signal processor is an image (video) signal processer that processes images input from the out-camera 133 and the in-camera 134. Furthermore, the image signal processor superimposes an object created by the main processor 111 on the input image and outputs it to the display 131. The image signal processor may be implemented by the main processor 111 or a processor dedicated to images and provided separately from the main processor 111.

In the present embodiment, the display 131 displays an image or the like that imitates a remote control screen as an AR object.

Each of the in-camera 133 and the out-camera 134 converts the light received through a lens into an electric signal using an electronic device such as a charge coupled device (CCD) or a complementary metal oxide semiconductor (CMOS) sensor to input image data of the surroundings and that of an object.

The out-camera 133 acquires images of the surroundings of the HMD 100. The out-camera 133 is installed on the front of the HMD 100 to capture images of a field-of-view condition in the front. The HMD 100 may be an optical see-through type HMD or a video see-through type, and both of them are designed to capture images of a field-of-view condition in front of the eyes by the out-camera 133 and acquire the data thereof.

The in-camera 134 captures images of a region different from an image acquisition region of the out-camera 133. For example, the in-camera 134 captures images of the eye of the user. In the present embodiment, the in-camera 134 functions not only as a processor that performs line-of-sight identification processing but also as a line-of-sight detection sensor.

The line-of-sight detection sensor includes a right line-of-sight detector and a left line-of-sight detector, which detect the line of sight of the right eye and the line-of-sight of the left eye, respectively. Note that a well-known technique commonly used as the eye tracking processing may be employed to detect the line of sight. For example, in a method using corneal reflection, irradiating an infrared LED (light emitting diode) to the face, capturing an image thereof using an infrared camera, and using a position on the cornea of the reflected light (corneal reflection) obtained by irradiation of the infrared LED as a reference point enables detection of a line of sight based on a position of the pupil with respect to the position of the corneal reflection. In this case, an infrared camera and an infrared LED are provided.

The audio processing device 140 is an audio processor that processes sounds, and includes a speaker 141 and the microphone 143.

The speaker 141 outputs an audio signal processed by an audio signal processor to the outside. In the case of the HMD 100, for example, a headphone may be used.

The microphone 143 converts voices of a user or the like into audio data and inputs the same. For example, the microphone 143 may include an ambient microphone and a voice microphone. These microphones collect ambient sounds and voices of the user 901. The microphone 143 may be connected to a headphone which is worn on the ear of the user 901 so as to acquire the sounds provided to the user 901.

The sensor 150 is a group of sensors for detecting the condition of the HMD 100. In the present embodiment, the sensor 150 includes a GPS (Global Positioning System) receiver 151, a gyro sensor 152, a geomagnetic sensor 153, an acceleration sensor 154, and a depth sensor 155. Providing the group of sensors enables detection of the position, motion, tilt, direction, and the like of the HMD 100. The depth sensor 155 acquires distance information from the HMD 100 to an object. Note that other sensors may be further provided.

The acceleration sensor 154 is a sensor for detecting the acceleration, which expresses the change in speed per unit time, and can capture the motion, vibration, impact, and the like. The gyro sensor 152 is a sensor for detecting the angular velocity in the rotational direction, and can capture the state of the vertical, horizontal, and oblique attitudes. Using the acceleration sensor 154 and the gyro sensor 152 mounted on the HMD 100 enables detection of the motion of the HMD 100.

The geomagnetic sensor 153 is a sensor for detecting the magnetic force of the earth, and detects the orientation in which the HMD 100 is directed. In the case of using a three-axis sensor capable of detecting the geomagnetism in the front and rear direction, left and right direction, and further upper and lower direction, capturing the geomagnetic change with respect to the motion of the HMD 100 enables detection of the motion of the HMD 100.

The depth sensor 155 is a sensor capable of capturing the shape of a target such as a human or an object as a three-dimensional object. The depth sensor 155 may be a LiDAR (Light Detection and Ranging) sensor configured to irradiate a laser beam such as an infrared ray onto the target, measure a scattered light which has been reflected, and analyze and detect the distance to the target at a long distance and the state of the target, a TOF (Time Of Flight) sensor configured to measure a reflected time of a pulse light irradiated onto the target for each pixel to obtain the distance, or a millimeter wave radar configured to emit radio waves in the millimeter wave band, capture the reflected waves, and detect the distance to the target and the state of the object.

The communication device 160 is a communication interface for wirelessly communicating with other information terminals in the vicinity and by the near field communication, wireless LAN, or base station communication. In the wireless communication, the communication device 160 transmits and received data via a transmission and reception antenna.

The communication device 160 includes a LAN (Local Area Network) communication I/F 161, a telephone network communication I/F 162, a BT (Bluetooth (registered trademark)) communication I/F 163, and an infrared communication I/F 164.

The LAN communication I/F 161 is connected to the network 530 such as the Internet via a wireless access point or the like, thereby realizing transmission and reception of data to and from servers on the network 530. Wi-Fi (registered trademark) or Bluetooth (registered trademark) may be used for connection to a wireless access point.

The telephone network communication I/F 162 is connected to a communication network using a mobile telephone communication network, thereby realizing transmission and reception of data to and from servers on a communication network. The communication system to be used is, for example, the third-generation mobile communication system (hereinafter referred to as "3G") such as GSM (registered trademark) (Global System for Mobile Communications), W-CDMA (Wideband Code Division Multiple Access), CDMA 2000, and UMTS (Universal Mobile Telecommunications System), or the communication system such as LTE (Long Term Evolution), the fourth generation (4G), and the fifth generation (5G).

The BT communication I/F 163 is an interface for communicating with an external device according to the Bluetooth standard. The infrared communication I/F 164 is an interface for communicating with an external device using infrared light. For example, IrDA (Infrared Data Association, registered trademark) is used.

To realize the near field communication, for example, Zigbee (registered trademark) or HomeRF (Home Radio Frequency, registered trademark) may be used. Alternatively, a wireless LAN such as Wi-Fi (registered trademark) or an ultra-wideband system (Ultra Wide Band: UWB) may be used.

The LAN communication I/F 161, the telephone network communication I/F 162, and the BT communication I/F 163, and the infrared communication I/F 164 include encoding circuits, decoding circuits, and antennas, respectively.

As a means of wireless communication, the communication device 160 may use other approaches such as optical communication using sound waves. In this case, a light emission and reception section and a sound wave output and input section are used instead of a transmission and reception antenna.

The extended I/F 105 is a group of interfaces for extending the functions of the HMD 100, and in the present embodiment, the extended I/F 105 includes a charging terminal, a video and audio interface, a USB (Universal Serial Bus) interface, a memory interface, and the like. The video and audio interface inputs video signals and audio signals output from an external video and audio output device, and outputs video signals and audio signals to an external video and audio input device. The USB interface is used for connection to SB devices. The memory interface is used for connection with a memory card and other memory media and thus transmission and reception of data.

Note that a part of the exemplary configuration of the HMD 100 illustrated in FIG. 3 is not essential to the present embodiment. Accordingly, even if the configuration of the HMD 100 does not include such an unessential component, the advantageous effects of the present embodiment are not impaired. In this connection, the configuration of the HMD 100 may further include components which are not illustrated, for example, a digital broadcast reception function and an electronic money settlement function.

[Functional Blocks of HMD]

Figure 4:
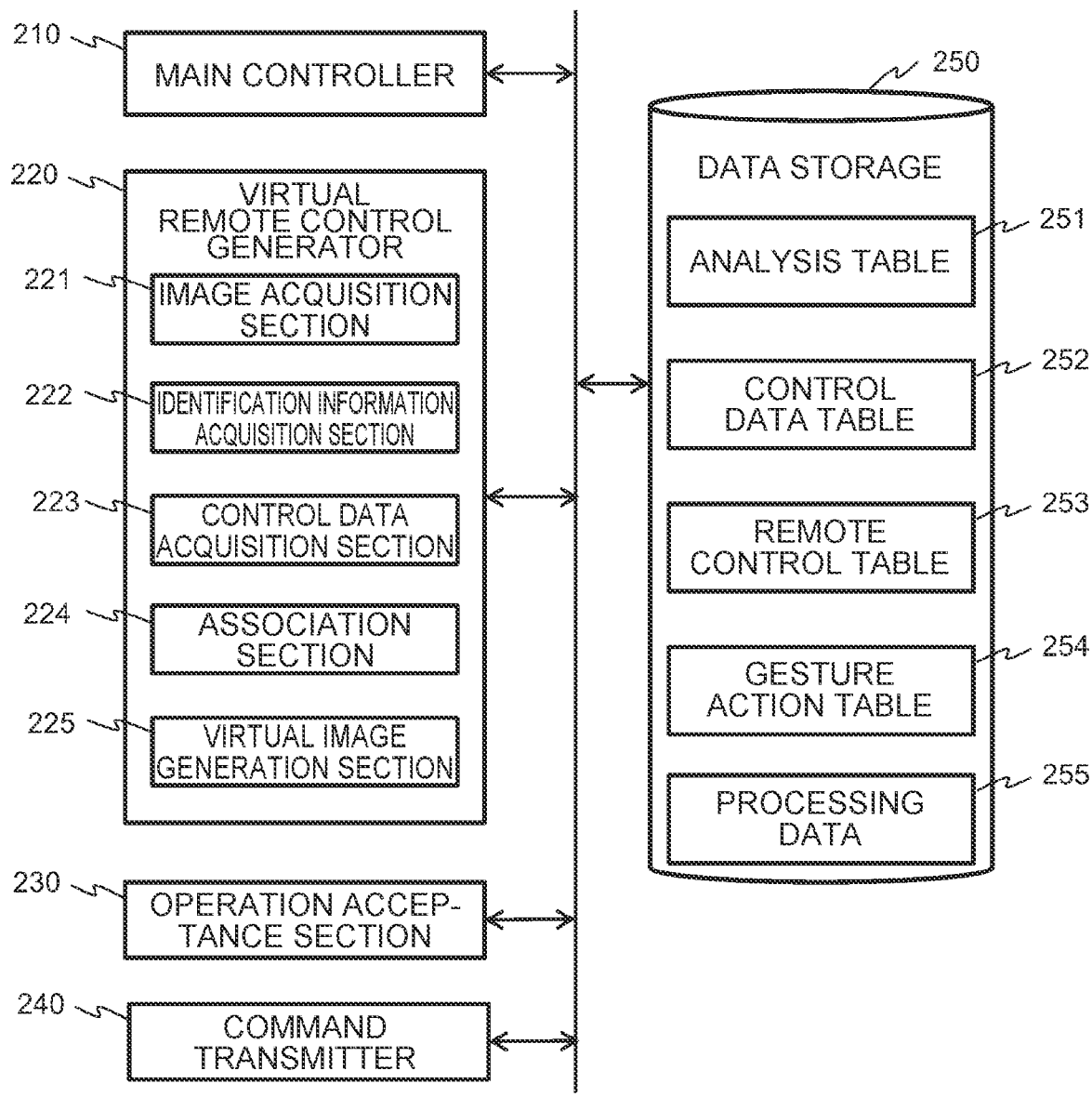
FIG. 4 is a functional block diagram of the HMD according to the embodiment of the present invention.

Next, a functional configuration of the HMD 100, which relates to the present embodiment, will be described. FIG. 4 is a functional block diagram of the HMD 100 according to the present embodiment. The main processor 111 loads the programs stored in the internal memory storage into the RAM 113 and executes them, whereby each of the functions illustrated in FIG. 4 are realized.

As illustrated in FIG. 4, the HMD 100 includes a main controller 210, a virtual remote control generator 220, an operation acceptance section 230, a command transmitter 240, and a data storage 250. The data storage 250 retains an analysis table 251, a control data table 252, a remote control table 253, a gesture action table 254, and processing data 255. The data storage 250 is constructed in the internal memory storage or the RAM 113.

The main controller 210 controls the entire operations of the HMD 100.

The virtual remote control generator 220 generates a virtual remote control of the controlled device 510 based on the description information 310 on the presentation surface 300. The virtual remote control is a function that allows the user 901 of the HMD 100 to use the description information 310 on the presentation surface 300 as if it was a remote control of the controlled device 510. The virtual remote control generator 220 according to the present embodiment generates a virtual remote control image 400 which presents a function button of a remote control superimposed on the corresponding description information 310 of the presentation surface 300. The operation acceptance section 230, which will be described later, accepts an operation instruction to the function button on the virtual remote control image 400 by the user 901, and the command transmitter 240 transmits a control command to the controlled device 510.

The virtual remote control generator 220 according to the present embodiment includes an image acquisition section 221, an identification information acquisition section 222, a control data acquisition section 223, an association section 224, and a virtual image generation section 225.

The image acquisition section 221 acquires an image of the presentation surface 300 serving as a base of a virtual remote control. In the present embodiment, the image acquisition section 221 captures an image of a real space using the out-camera 133 to acquire an image of the surroundings. The real space to be photographed includes the description information 310 on the presentation surface 300.

The identification information acquisition section 222 performs the identification information acquisition processing. In the identification information acquisition processing, the identification information acquisition section 222 analyzes the surrounding image acquired by the image acquisition section 221, and identifies a controlled device that the user 901 wants to operate and a desired control operation that the user wants to perform. In the present embodiment, the identification information acquisition section 222 analyzes the description information 310 on the presentation surface 300 to identify a controlled device and a desired control operation. For identification thereof, the identification information acquisition section 222 uses the analysis table 251. The identification information acquisition section 222 outputs results of identification as controlled device identification information and desired control operation identification information, respectively. The details of the analysis table 251 and identification information acquisition processing will be described later.

The control data acquisition section 223 performs the control data acquisition processing. In the control data acquisition processing, the control data acquisition section 223 acquires the control data on the controlled device 510 identified by the identification information acquisition section 222. Firstly, the control data acquisition section 223 determines whether the control data on the controlled device 510 is stored in the control data table 252 of the own device (HMD 100). If it is not stored, the control data acquisition section 223 checks whether a controlled device 510 that is connectable and not stored in the control data table 252 is available. When a controlled device 510 that is not stored in the control data table 252 is found, the control data acquisition section 223 acquires the information on the controlled device 510, for example, the name of the device and the model number thereof, and then acquires the control data from the network server 550. The control data acquired from the network server 550 is stored in the control data table 252 in association with the identification data (ID) assigned to each controlled device 510. The details of the control data acquisition processing and control data table 252 will be described later.

Note that the control data includes a possible control operation of each controlled device 510 and a control command for each control operation.

The association section 224 performs the association processing for associating a desired control operation identified by the identification information acquisition section 222 with a control command included in the control data. A result of the association processing is stored in the remote control table 253. This remote control table 253 corresponds to the control data of a virtual remote control desired by the user 901. The details of the association processing and remote control table 253 will be described later.

The virtual image generation section 225 generates a virtual remote control image 400 that functions as a virtual remote control, and displays it on the display 131. The display position of the virtual remote control image 400 is set to a position in which the direction of the line-of-sight of the user 901 matches the presentation surface 300. The virtual image generation section 225 uses the remote control table 253 to generate the virtual remote control image 400.

Figure 5:
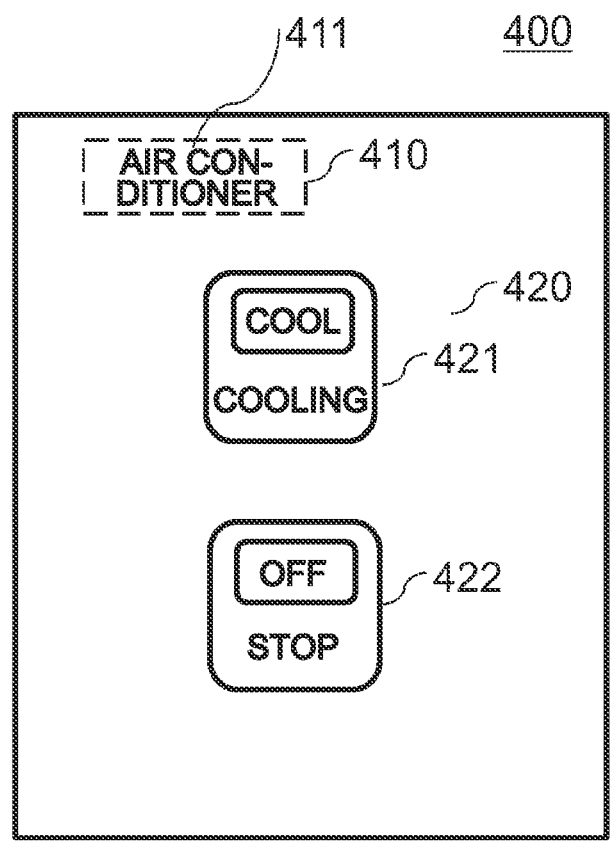
FIG. 5 is a diagram for explaining an example of a virtual remote control image according to the embodiment of the present invention.

FIG. 5 illustrates an example of the generated virtual remote control image 400. As illustrated in FIG. 5, the virtual remote control image 400 includes a controlled device information display area 410 and a desired control operation display area 420.

In the controlled device information display area 410, a controlled device name 411 is displayed as the information identifying the controlled device identified by the identification information acquisition section 222. In FIG. 5, for example, the controlled device name 411 is displayed as "air conditioner".

In the desired control operation display area 420, acceptance objects 421, 422 serving as the function buttons for accepting an instruction from the user 901 to the desired control operation identified by the identification information acquisition section 222 are displayed. The acceptance objects 421, 422 are created for desired control operations, respectively. The display positions of the acceptance objects 421, 422 are set to the positions in the description information 310 on the presentation surface 300, where the pieces of information corresponding to the desired control operations are described.

The operation acceptance section 230 accepts an operation instruction from the user 901 to a virtual remote control (virtual remote control image 400). In the present embodiment, for example, when operation instructions to the acceptance objects 421, 422 are detected, the operation acceptance section 230 accepts them as operation instructions to the desired control operations corresponding to the acceptance objects 421, 422.

The operation instruction is provided through, for example, a gesture action and a line-of-sight operation. In order to detect the operation instruction, the operation acceptance section 230 refers to the gesture action table 254 and the like to analyze the actions and operations. When a predetermined action has been performed, the operation acceptance section 230 determines that the acceptance objects 421, 422 are selected. Then, the operation acceptance section 230 identifies the desired control operations associated with the acceptance objects 421, 422.

The operation acceptance section 230 detects a gesture action of the user 901 based on, for example, the sensor 150 provided in the HMD 100 or the motion of the hand extracted from the image captured by the out-camera 133. The operation acceptance section 230 can detect the line-of-sight operation using the function of the line-of-sight detection sensor.

The command transmitter 240 transmits a control command associated with the identified desired control operation to the controlled device. In the present embodiment, the command transmitter 240 transmits it to the controlled device 510 via the communication device 160 and the wireless router 520. The control command is acquired from the remote control table 253.

[Analysis Table]

In the following, an example of the analysis table 251 will be described. The analysis table 251 is used in analyze of the description information 310 by the identification information acquisition section 222. In the analysis table 251, results of analysis are registered in association with, for example, a character string, figure, and color (hereinafter, referred to as a character string and the like) that are possibly to be described in the description information 310.

FIG. 6 is a diagram illustrating an example of the analysis table 251 according to the present embodiment. As illustrated in FIG. 6, in the analysis table 251, for each description content 251*a*, an analysis content 251*b* and a description type 251*c* are registered in association with each other.

In the description content 251*a*, for example, candidates such as a character string and the like to be described as the description information 310 by the user 901 on the presentation surface 300 are stored. For example, in the description content 251*a*, the names of controlled devices 510 such as air conditioner, A/C, lighting fixture, light, lamp, and television, and the name of desired control operations such as cool, heat, dehumidify, blow, stop, turn on, and turn off are stored. Here, together with each name of the controlled device 510 and each name of the desired control operation, various different names and descriptions thereof are stored in the description content 251*a*. These are character strings and the like that are possibly to be described by the user 901.

In the analysis content 251*b*, the analysis contents of the names of the controlled devices 510 or names of the desired control operations described in the description content 251*a* are stored. The analysis content is information uniquely identifying a character string and the like that are possibly to be described by many users 901.

In the present embodiment, for example, in the case where the description content 251*a* includes the names of the controlled device 510, the device name identifying the controlled device 510 is stored in the analysis content 251*b*. Specifically, in the case where the description content 251*a* includes "air conditioner", "A/C", etc., "air conditioning device" is stored in the analysis content 251*b*. In the case where the description content 251*a* includes "lighting fixture", "light", and "lamp", "lighting device" is stored in the analysis content 251*b*.

In the case where the description content 251*a* includes the name of a desired control operation, information identifying the desired control operation is stored in the analysis content 251*b*. Specifically, when the description content 251*a* includes "cool" and the like, "turn on cooling function" is stored in the analysis content 251*b*, and in the case where the description content 251*a* includes "stop" and the like, "stop" is stored in the analysis content 251*b*.

In the description type 251*c*, the type of the description content 251*a* is stored. In the present embodiment, either of whether it indicates the controlled device 510 or the desired control operation is registered.

The identification information acquisition section 222 analyzes the description information 310 on the presentation surface 300 and extracts a character string and the like. Then, the identification information acquisition section 222 searches for the description content 251*a* of the analysis table 251 to detect the information matching the extracted character string and the like. Then, the identification information acquisition section 222 extracts the analysis content 251b and description type 251c registered in association therewith. In the case where the description type 251c indicates a controlled device, the identification information acquisition section 222 outputs the analysis content 251b as the controlled device identification data. On the other hand, in the case where the description type 251c indicates a desired control operation, the identification information acquisition section 222 outputs the analysis content 251b as the desired control operation identification information.

Here, a specific example in which the identification information acquisition section 222 analyzes the description information 310 will be described using the analysis table 251 as an example. The identification information acquisition section 222 compares the content described as the description information 310 on the presentation surface 300 with the description content 251a, and sets, as an analysis result, the analysis content 251b and description type 251c of the data having the matched data.

For example, in the case where, as the description information 310, a character string such as "air conditioner" or "A/C" is described, the identification information acquisition section 222 sets "air conditioning device" and "controlled device" which are the analysis content 251b and the description type 251c, respectively, as the analysis result.

In the case where, as the description information 310, "cooling", "cool", "COOLING", "COOL", or the like is described, the identification information acquisition section 222 sets "turn on cooling function" and "desired control operation" as the analysis result.

In the case where, as the description information 310, "stop", "sto", "STOP", "STO", or the like is described, the identification information acquisition section 222 sets "stop" and "desired control operation" as the analysis result.

In the case where, as the description information 310, "heating", "heat", "HEATING", "HEAT", or the like is described, the identification information acquisition section 222 sets "turn on heating function" and "desired control operation" as the analysis result.

In the case where, as the description information 310, "dehumidifying", "dehumidi", "DEHUMIDIFYING", "DEHUMIDI", or the like is described, the identification information acquisition section 222 sets "turn on dehumidifying function" and "desired control operation" as the analysis result.

In the case where, as the description information 310, "LIGHT", "light", "ILLUMINATION", "illumination", "lamp", or the like is described, the identification information acquisition section 222 sets "lighting fixture" and "controlled device" as the analysis result.

The analysis table 251 is one of the examples, and other character strings that are not described in the analysis table 251 and analysis contents of such character strings are not explained herein. Each of the character strings is merely an example. Furthermore, as described above, figures (illustrations), pictograms (snow marks, flame marks, and the like), symbols, and the like can be used as the description information 310 in addition to a character string.

In the case where the information described in the description information 310 is not registered in the analysis table 251, the identification information acquisition section 222 newly registers a result of analysis of the description information 310 (character string and the like) in the description content 251a. In this case, the identification information acquisition section 222 receives registration of the corresponding analysis content 251b and description type 251c from the user 901.

[Control Data Table]

The control data table 252 retains the control data on the controlled device 510. FIG. 7(a) is a diagram illustrating an example of the control data table 252 according to the present embodiment. As illustrated in FIG. 7(a), the control data table 252 retains identification information (ID) 252b and control data 252c in association with controlled device name 252a, and also retains detailed information 252d on the controlled device 510.

The ID 252b may be the one capable of uniquely identifying the control data on the controlled device 510. For example, as the ID 252b, a model number or the like set by its manufacturer may be used. The control data 252c is a set of control commands of each controllable operations in the controlled device. The detailed information 252d includes, for example, the name, name of the manufacturer, and physical address. The detailed information 252d is used for, for example, connection between the HMD 100 and the controlled device 510. The detailed information 252d may be stored not in the control data table 252 but as a sub-table associated with the ID 252b.

In the control data table 252, for each controlled device 510 that has been previously connected or is possibly used by the user 901, pieces of the information described above are registered in advance. The information may be acquired by the control data acquisition section 223 from the network server 550 and registered in the control data table 252.

[Remote Control Table]

Next, the remote control table 253 will be described. The remote control table 253 is a table in which information identifying the controlled device 510 as a control target of a virtual remote control and a control command of each desired control operation are stored.

FIG. 7(b) is a diagram illustrating an example of the remote control table 253 according to the present embodiment. As illustrated in FIG. 7(b), in the remote control table 253, a description type 253a, analysis content 253b, identification information (ID) 253c, control command 253d, area 253e, and display data 253f are stored. Note that in the remote control table 253, creation date and time 253g may be stored.

The description type 253a indicates the type (controlled device or desired control operation) of the description information 310. In the present embodiment, the description type 251c obtained as a result of analysis by the identification information acquisition section 222 using the analysis table 251 is stored as the description type 253a.

The analysis content 253b indicates a result of analysis of the description information 310 by the identification information acquisition section 222. In the present embodiment, the analysis content 251b of the analysis table 251 is stored as the analysis content 253b.

In the case where the description type 253a indicates a controlled device, as the ID 253c, the ID uniquely identifying the controlled device is stored. The ID of the controlled device 510 is acquired by the identification information acquisition section 222 from the main body of the controlled device, network, or the like based on the analysis content 251b of the controlled device.

In the case where the description type 253a indicates a desired control operation, as the control command 253d, a control command corresponding to the control operation is stored. The data is acquired from the control data table 252 and stored by the association section 224.

The display data 253f indicates data to be displayed on the virtual remote control image 400. The area 253e indicates information identifying a display area of the virtual remote control image 400. In the present embodiment, a result of analysis by the identification information acquisition section 222 is stored. Note that, as the area 253e, for example, data identified based on the pixel positions of the image acquired by the HMD 100 is stored.

The virtual image generation section 225 makes the handwritten character string described on the presentation surface 300 resemble the function buttons to generate acceptance objects for a group of the function buttons.

For example, upon generating the virtual remote control image 400, for the data in which the "controlled device" is registered as the description type 253a, the virtual image generation section 225 causes the controlled device information display area 410 to display the information registered in the display data 253f. In the case of FIG. 7(b), the displayed information is "air conditioner".

Furthermore, the virtual image generation section 225 causes the desired control operation display area 420 of the virtual remote control image 400 to display the display data 253f of all the data in which "desired control operation" is registered as the description type 253a. In the case of FIG. 7(b), the displayed information is "cool" and "stop".

After a predetermined period of time passes or when receiving an instruction from the user 901, the main controller 210 erases displaying of the virtual remote control image 400. At this time, the main controller 210 also erases the remote control table 253. This can avoid the memory from being wastefully consumed. The predetermined period of time is, for example, one minute, one hour, during the registration date, and one week.

Furthermore, the remote control table 253 may be erased after displaying of the virtual remote control image 400 was erased and then a predetermined period of time set separately has been passed. In this case, even if displaying of the virtual remote control image 400 has been erased, as long as the remote control table 253 has not been erased, in response to the event that the user 901 looks at the controlled device 510, the virtual remote control image 400 is displayed again to accept an operation. Note that the remote control table 253 may be erased when the virtual remote control generation processing for the next controlled device 510 is started.

[Gesture Action Table]

Next, an example of the gesture action table 254 will be described. The gesture action table 254 is a table in which an operation instruction is registered in association with each gesture of the user 901. The gesture action table 254 is used in identification of an operation instruction based on a gesture action of the user 901 detected by the operation reception section 230.

FIG. 8 is a diagram illustrating an example of the gesture action table 254 according to the present embodiment. As illustrated in FIG. 8, the gesture action table 254 includes a gesture action 254a and an operation instruction 254b.

The gesture action 254a indicates a gesture of the user 901 that may be detected by the operation acceptance section 230.

The operation instruction 254b indicates the content of an operation instruction corresponding to each gesture. The content of the operation instruction is determined in advance. The user 901 may register the desired operation instructions therein.

For example, upon detecting an operation of touching function buttons that are the acceptance objects 421, 422 as a gesture action of the user 901, the operation acceptance section 230 determines that an instruction to execute the corresponding function (here, control operation) is provided, and acquires the control command associated with the execution instruction from the remote control table 253. The command transmitter 240 transmits the control command to the controlled device 510.

For example, as illustrated in FIG. 8, upon detecting, as a gesture action, an operation of sliding the presented function button within the display area of the group of function buttons while keeping pressing the function button, the operation acceptance section 230 determines that an instruction to move the function button is provided. Upon detecting, as a gesture action, an operation of sliding the presented function button toward out of the display area while keeping pressing the function button, the operation acceptance section 230 determines that an instruction to erase the function button is provided. Upon detecting, as a gesture action, an operation of drawing an arc so as to surround the entire of the presented group of function buttons, the operation acceptance section 230 determines that an instruction to select the function buttons surrounded by the arc is provided. Upon detecting a gesture action in which the user 901 move his or her hand laterally, the operation acceptance section 230 determines that an instruction to terminate displaying of the function buttons is provided.

Each of the gesture actions is merely an example, and, needless to say, other gesture actions are enabled. For example, as described above, a function button may be selected using the line of sight of the user 901 detected by the in-camera 134.

Providing the gesture action table 254 enables the user 901 to freely set the arrangement of function buttons.

In the processing data 255, data necessary for processing, data generated during processing, and data generated as a result of processing are stored.

Using these functions and data, the user 901 performs the remote control processing described with reference to FIG. 1. That is, by simply visually recognizing the presentation surface 300 through the display 131 of the HMD 100, the user 901 wearing the HMD 100 can obtain an operational environment as if the presentation surface 300 became a remote controller.

[Remote Control Processing]

Figure 9:
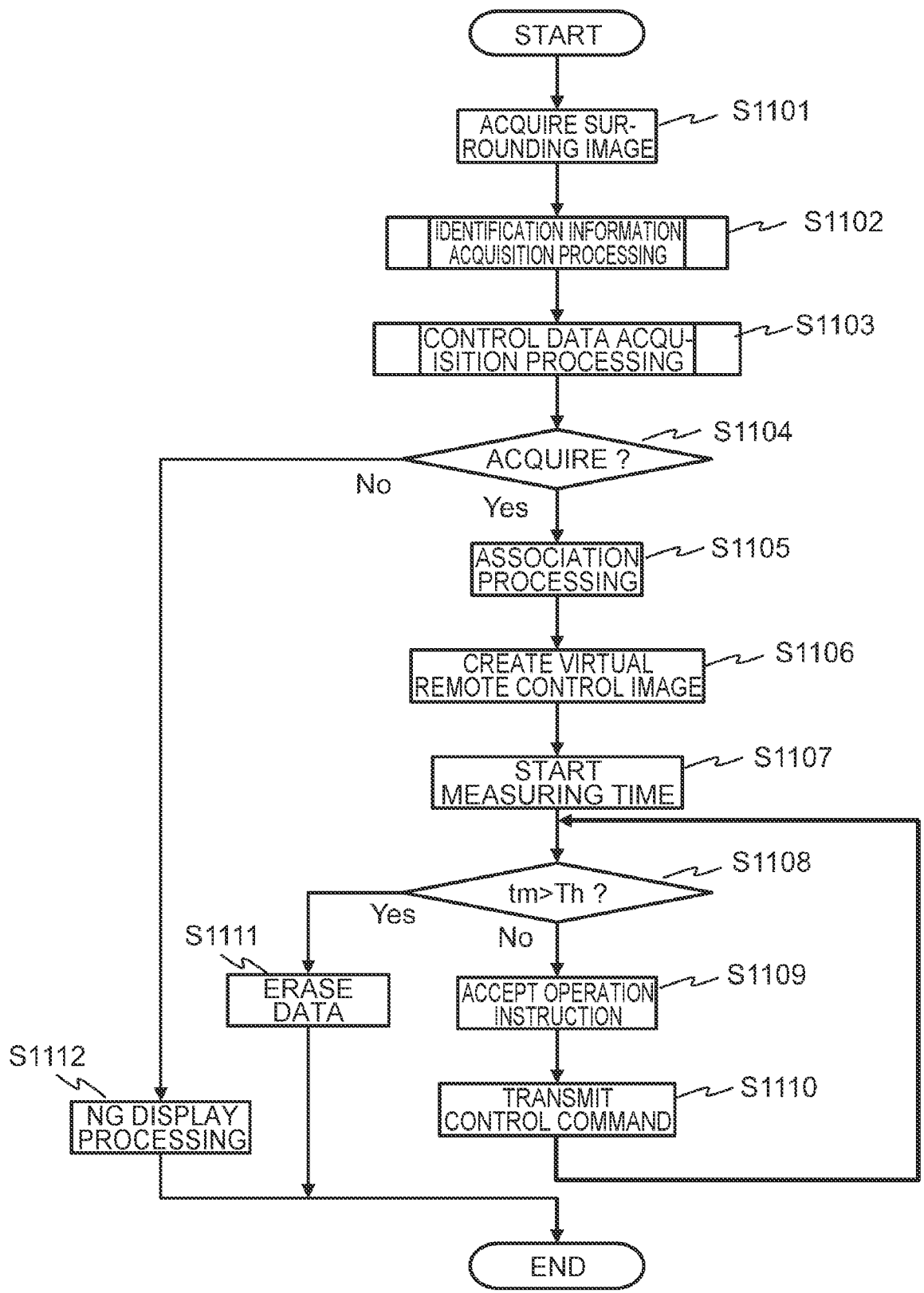
FIG. 9 illustrates a flowchart of the remote control processing according to the embodiment of the present invention.

Next, a flow of the remote control processing including the virtual remote control generation processing, which is performed by the HMD 100 according to the present embodiment, will be described. FIG. 9 illustrates a processing flow of the remote control processing according to the present embodiment. This processing is started when the HMD 100 detects an instruction from the user 901 or detects the presentation surface 300. In the following, an example in which the virtual remote control image 400 is created and then the data thereof is erased after a predetermined period of time passes will be described.

Firstly, the image acquisition section 221 acquires an image of the surroundings (step S1101).

The identification information acquisition section 222 performs the identification information acquisition processing of acquiring the identification information (controlled device identification information and desired control operation identification information) based on the surrounding image (step S1102).

The control data acquisition section 223 performs the control data acquisition processing of acquiring the control data on the controlled device 510 based on the controlled device identification information (step S1103). The control data is acquired from the memory and storage 110 when it is stored in the memory and storage 110 of the own device, or acquired from the network server 550 if it is not stored in the memory and storage 110, via the communication device 160.

The control data acquisition section 223 determines whether the control information on the device identified as the controlled device could be acquired in step S1103 (step S1104).

When the control data has been acquired from either the own device or the network server 550 (step S1104; Yes), the association section 224 performs the association processing of completing the remote control table 253 (step S1105). In this processing, a control command is associated with a desired control operation.

The virtual image generation section 225 refers to the remote control table 253 to generate a virtual remote control image (step S1106). Here, the virtual image generation section 225 creates display data including the acceptance objects 421, 422 of the function buttons associated with the control commands and the name of the controlled device 510. The virtual image generation section 225 creates the display data such that the pieces of information are arranged, respectively, in the corresponding areas of the surrounding image acquired by the image acquisition section 221. For example, as illustrated in FIG. 1, the name of the controlled device is displayed in the area where "air conditioner" is described on the presentation surface 300, the function button for accepting an instruction of "cooling" is displayed in the area where "cooling" is described on the presentation surface 300, and the function button for accepting an instruction of "stop" is displayed in the area where "stop" is described on the presentation surface 300.

In the case where the display 131 is a see-through type display, the virtual remote control image may not be displayed. However, even such an HMD holds the area information on the function buttons (acceptance objects 421, 422) to accept an instruction from the user 901. For example, the see-through type HMD holds information on the arrangement positions of the acceptance objects 421, 422 and information on the corresponding control operations to allow the operation reception section 230 to accept an operation instruction from the user 901.

Here, the main controller 210 causes the timer 106 to start measuring the time (step S1107). Then, the main controller 210 determines whether a value tm of the timer exceeds a predetermined period of time Th (tm≤Th) (step S1108). When it exceeds the period of time Th (tm>Th), the main controller 210 erases the remote control table 253 (step S1111), and ends the processing.

On the other hand, during the period of time (tm≤Th), when accepting an operation instruction of the desired control operation from the user 901 (step S1109), the operation acceptance section 230 extracts the control command for the accepted control operation from the remote control table 253.

The command transmitter 240 transmits the extracted control command to the controlled device 510 via the communication device 160 (step S1110), and returns to step S1108.

When the control data could not be acquired in step S1104 (step S1104; No), the main controller 210 performs the display processing for the case of failing to acquire the control data (NG display processing) (step S1112), and ends the processing. The NG display processing is performed to, for example, display a message indicating that the control data on the designated controlled device 510 is not available on the display 131, or a message indicating that a virtual remote control cannot be created on the display 131.

[Identification Information Acquisition Processing]

Figure 10:
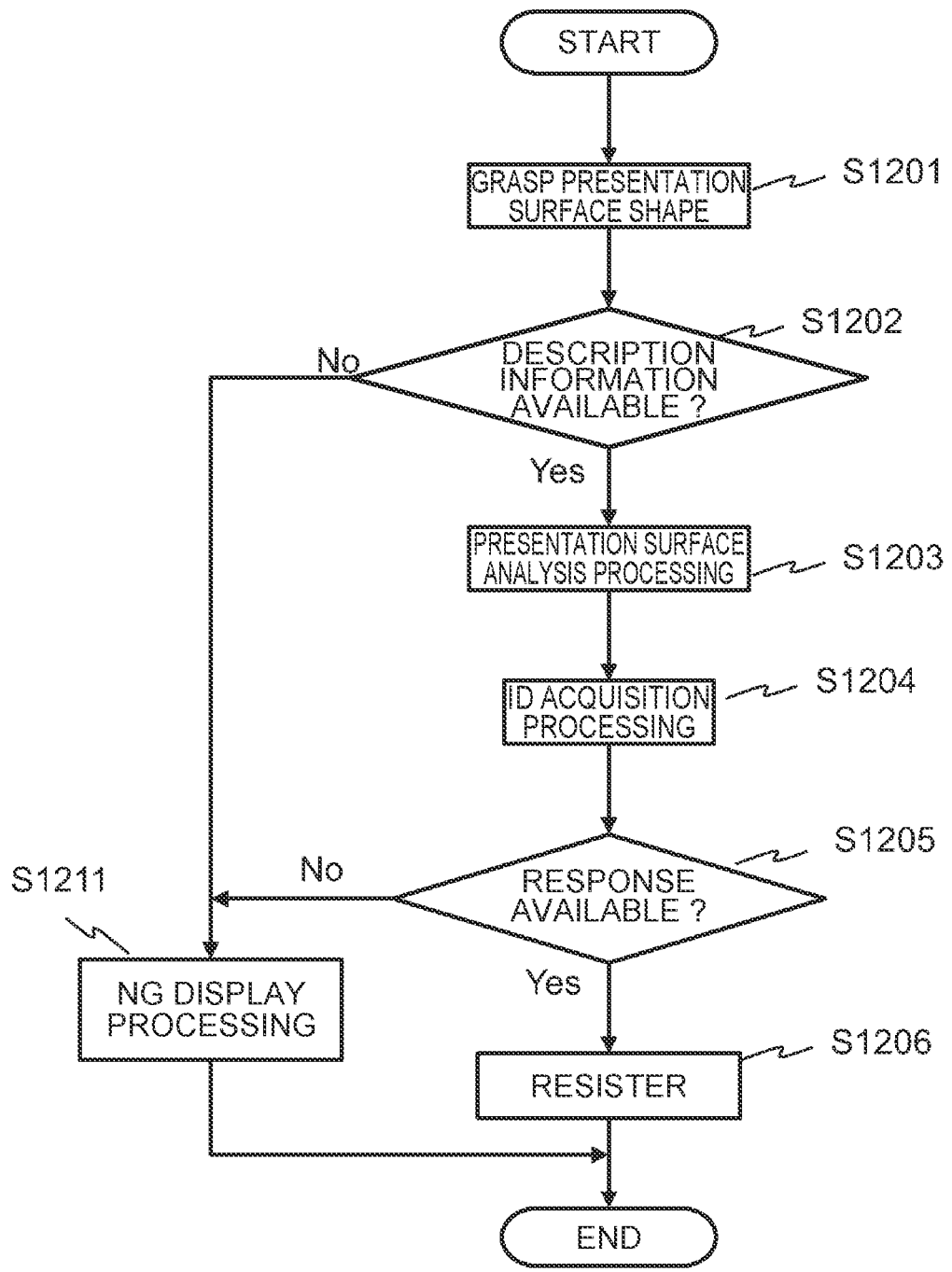
FIG. 10 illustrates a flowchart of the identification information acquisition processing according to the embodiment of the present invention.

Next, a flow of the identification information acquisition processing by the identification information acquisition section 222 will be described. FIG. 10 illustrates a processing flow of the identification information acquisition processing according to the present embodiment. This processing is performed to analyze the surrounding image to complete the description type 253a, analysis content 253b, and ID 253c of the remote control table 253.

Firstly, the identification information acquisition section 222 performs the presentation surface shape grasp processing (step S1201). This presentation surface shape grasp processing is performed to grasp the shape of the presentation surface 300. Specifically, the identification information acquisition section 222 analyzes the surrounding image captured by the out-camera 133 to detect the predetermined shape of the presentation surface 300. In the present embodiment, an outer frame 305 is detected. Inside the area of the detected outer frame 305 is set as a scanning area for detecting the name of a controlled device 510 and the information on a desired control operation. As described above, on the presentation surface 300, the name of a controlled device and a desired control operation are to be described as the description information 310.

The shape of the outer frame 305 is, for example, a rectangle. However, the shape is not limited thereto. The shape may not be an exact figure, and the shape like a rectangle is determined as a rectangle since, for example, in the case of a handwritten rectangle, rectangular line may not be stable or a corner thereof may be somewhat rounded. Alternatively, the identification information acquisition section 222 may determine, as the presentation surface 300, the combination of the rectangular outer frame 305 and a mark and character described within the rectangular outer frame 305. For example, each feature of a mark surrounding "remote control" or "re" by a circle or a user's favorite mark may be used for determination of the presentation surface 300.

Next, the identification information acquisition section 222 determines whether the description information 310 that may fall within the controlled device information or the desired control operation information is included in the scanning area of the presentation surface 300 (step S1202). In order to determine the presence or absence of the information, for example, the scanning region is binarized, and the simple image analysis processing to determine whether a continuous black region having the predetermined size or more is present is performed.

When it is determined that no description information 310 is included (step S1202; No), the NG display processing is performed (step S1211) and then the processing is ended. The NG display processing is performed, for example, to output a message indicating that the description information 310 cannot be detected. In the case where the degree of the likelihood of the presentation surface 300 has been calculated in the determination of the presentation surface 300, the message above may be output when the degree is equal to or more than a certain threshold value.

When it is determined that the description information 310 is included (step S1202; Yes), the identification information acquisition section 222 performs the presentation surface analysis processing of analyzing the scanning area in detail (step S1203). The presentation surface analysis processing is performed to analyze the description information 310 to extract the controlled device information candidates and the desired control operation information candidates.

In order to extract the controlled device information candidates and the desired control operation information candidates, the identification information acquisition section 222 compares the result of analysis of the description information 310 with the description content 251a registered in the analysis table 251. For example, in the example of FIG. 1, "air conditioner" is extracted as a controlled device information candidate, and "cooling" and "stop" are extracted as desired control operation candidates. At this time, the identification information acquisition section 222 decides the analysis content 251b corresponding to each of the controlled device information candidate and the desired control operation candidates.

Next, the identification information acquisition section 222 performs the ID acquisition processing of acquiring the identification information (ID) of the controlled device 510 based on the controlled device information candidate (step S1204). Here, the ID is information, such as a model number, which uniquely identifies the controlled device 510. For example, it may be detailed information of a device such as a manufacturer name, type of device, and physical address of the controlled device 510.

For example, the identification information acquisition section 222 checks the analysis table 251 against the controlled device information candidate to select the type of device. The type of device is, for example, information registered as the analysis content 251b of the analysis table 251. Then, the identification information acquisition section 222 may acquire the identification information (ID) 252b of each of all the records in which the type of device as selected is registered as the controlled device name 252a from the control data table 252, transmit a request for establishing connection to the surroundings using the detailed information 252d corresponding to the acquired identification information 252b, and determine whether a response thereto can be received. In this case, the identification information acquisition section 222 can receive a response only from the device of the type falling within the selected type.

Performing the ID acquisition processing enables determination as to whether the controlled device 510 to which a control command by the virtual remote control can be transmitted is present in the surroundings. That is, the identification information acquisition section 222 determines whether it can receive a response within a predetermined period of time (step S1205).

When having received a response within the predetermined period of time (step S1205; Yes), the identification information acquisition section 222 outputs the extracted and identified analysis content 251b and the description type 251c and ID 252b thereof to the control data acquisition section 223. Furthermore, the identification information acquisition section 222 registers the extracted and identification information in the remote control table 253 (step S1206), and ends the processing. The information to be registered is the description type 253a, analysis content 253b, and ID 253c, and also the area 253e and display data 253f obtained in the presentation surface analysis processing.

On the other hand, when not having received the response (step S1205; No), the identification information acquisition section 222 proceeds to step S1211 to perform the NG display processing, and then ends the processing. In this case, the NG display processing is performed to output a message indicating that no controlled device 510 to which an operation command can be transmitted with the virtual remote control is available in the surroundings.

Note that a rule for selecting a device in the case where responses are obtained from a plurality of controlled devices 510 can be determined in advance. The rule is, for example, setting a device that has transmitted a response earliest, setting a device in the direction of the line-of-sight of the user 901, or presenting the devices in order to accept selection by the user 901.

The identification information acquisition section 222 may search for a connectable controlled device 510 in the case of not having received a response from a desired device. At this time, when detecting new controlled devices 510 that are not registered in the control data table 252, the identification information acquisition section 222 acquires the detailed information on the new controlled devices 510 and registers them in the control data table 252. Then, the identification information acquisition section 222 checks whether a device falling within a controlled device information candidate is included in the new controlled devices 510.

Furthermore, for example, in the case where the user 901 knows that a new controlled device 510 should be present, he or she may take a picture of the manufacturer name or model number of the controlled device 510 using the out-camera 133 to acquire the ID 252b. The user 901 may take a picture of the appearance of the controlled device 510 to send an inquiry, together with the picture, to the network server 550. Alternatively, the user 901 may acquire the information from the official site of the manufacturer or the like. In this case, the user 901 may handwrite some of the detailed information on the presentation surface 300 to acquire them as the picture data. Furthermore, the user 901 may utter some of the detailed information to acquire them via the audio processing device 140.

In this case as well, when being registered in the control data table 252, each of the controlled devices 510 is provided with the ID.

Note that the user 901 does not have to accurately describe, on the presentation surface 300, the name of the controlled device 510 as the information on the controlled device 510. For example, the user 901 may describe other characters such as "A/C" and "cool air blower", or draw a picture that can be determined as an air conditioner. In the present embodiment, various types of expressions that may be described by the user 901 are registered in the analysis table 251 in advance. Furthermore, Artificial Intelligence (AI) may be used to analyze, as the description information 310, the content described by the user 901 on the presentation surface 300.

[Control Data Acquisition Processing]

Figure 11:
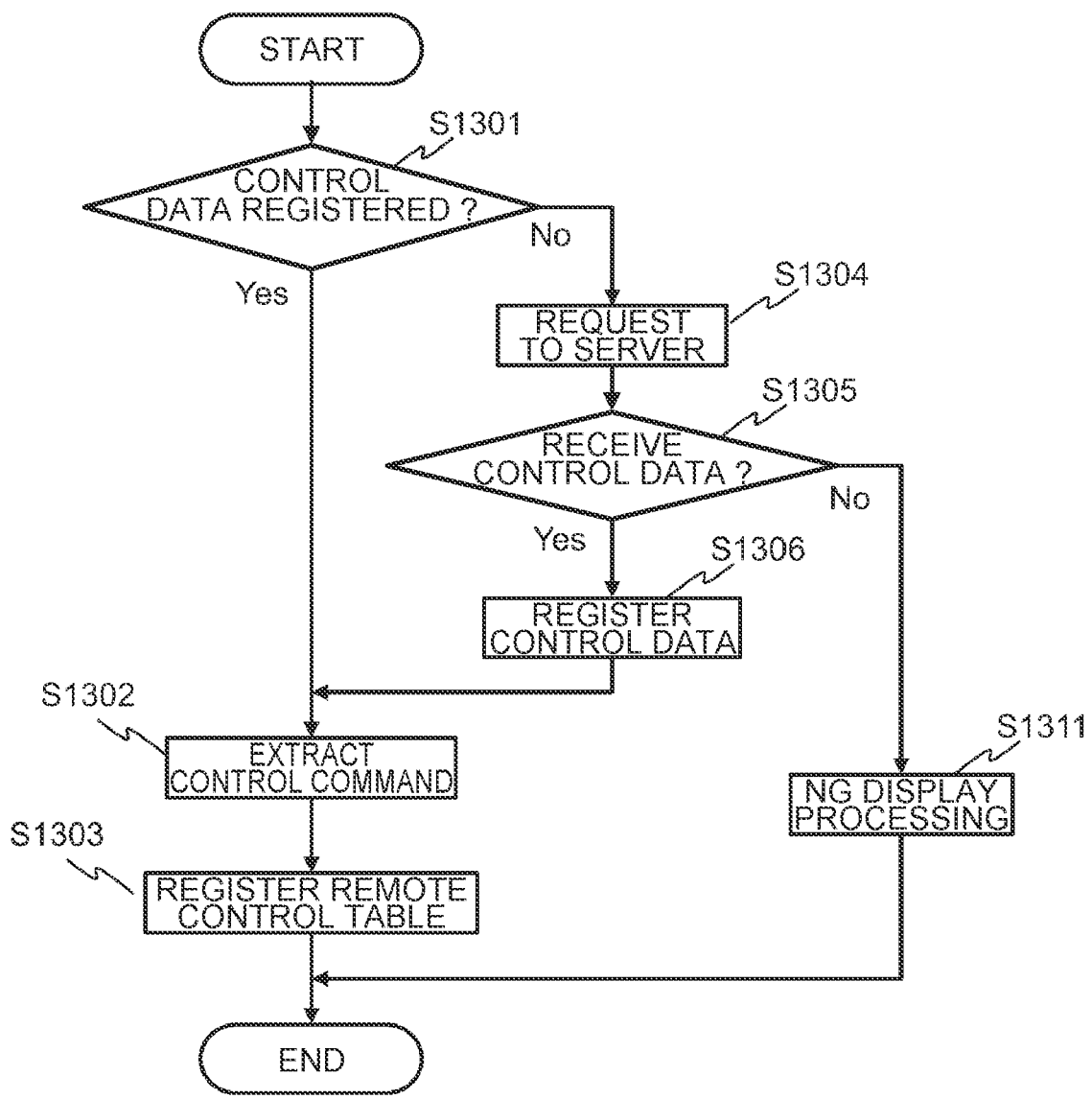
FIG. 11 illustrates a flowchart of the control data acquisition processing according to the embodiment of the present invention.

Next, the control data acquisition processing by the control data acquisition section 223 will be described. FIG. 11 illustrates a processing flow of the control data acquisition processing according to the present embodiment. This processing is performed to acquire the control data on the controlled device 510 identified in the identification information acquisition processing.

The control data acquisition section 223 searches the control data table 252 to determine whether the control data on the controlled device 510 identified by the identification information acquisition section 222 is registered based on the controlled device identification information including the ID of the controlled device 510 (step S1301). Here, the control data acquisition section 223 searches the control data table 252 based on the ID to determine whether data having an ID that matches the ID 252b is registered.

When the matched data is found and the control data has been registered (step S1301; Yes), the control data acquisition section 223 performs the control command extraction processing (step S1302). Specifically, the control data acquisition section 223 refers to the control data of the matched data to extract, for each desired control operation, the control command associated with the analysis content of the desired control operation. In the case where the identification information acquisition section 242 has acquired the ID of the controlled device 510 from the ID control data table 252 in the identification information acquisition processing, the control data acquisition section 223 may extract the control command based on the control data 252c associated with the acquired ID 252b without searching the control data table 252 again.

Then, the control data acquisition section 223 registers each of the extracted control commands in the remote control table 253 in association with the desired control operation (step S1303), and ends the processing.

When no matched data is found (step S1301; No), the control data acquisition section 223 requests the network server 550 to transmit the control data corresponding to the ID (step S1304). Then, the control data acquisition section 223 determines whether the control data has been returned (step S1305).

When having received the control data by return (step S1305; Yes), the control data acquisition section 223 registers the received control data in the control data table 252 in association with the name and ID of the controlled device (step S1306), and proceeds to step S1302.

Although having requested the network server 550 to transmit the control data, in the case of obtaining a response indicating that no control data is found or obtaining no response within a predetermined period of time in step S1305 (step S1305; No), the control data acquisition section 223 performs the NG display processing (step S1311), and ends the processing. In the NG display processing, the control data acquisition section 223 outputs, for example, a message indicating that the control data on the controlled device 510 is not available.

As described above, the HMD 100 according to the present embodiment includes the communication device 160, and transmits a control command to the controlled device 510 via the communication device 160 to remotely control the controlled device 510. The HMD 100 includes the virtual remote control generator 220 that identifies the controlled device 510 and a desired control operation that is a control operation desired to be performed from a surrounding image that is an image of the surroundings, and generates the acceptance objects 421, 422 for accepting an operation instruction to the identified desired control operation from the user 901, the operation acceptance section 230 for accepting the operation instruction from the user 901 via the acceptance objects 421, 422, and the command transmitter 240 that transmits a control command corresponding to the operation instruction accepted by the operation acceptance section 230 to the controlled device 510.

The surrounding image includes the presentation surface 300 having a description indicating a desired control operation. The virtual remote control generator 220 includes: the identification information acquisition section 222 that acquires controlled device identification information for identifying the controlled device and desired control operation identification information for identifying the desired control operation, respectively, from the surrounding image, the control data acquisition section 223 that acquires control data on the controlled device using the controlled device identification information; the association section 224 that associates a control command for controlling the controlled device included in the control data with a desired control operation identified; and the virtual image generation section 225 that generates the acceptance objects 421, 422, and generates a virtual remote control image in which each of the acceptance objects 421, 422 is arranged in an area where a description indicating the desired control operation is displayed if the surrounding image is displayed on the display 131.

As described above, the HMD 100 according to the present embodiment is configured to capture an image of a surface for presenting a remote control function button (presentation surface 300) using the out-camera 133 mounted on the HMD 100, grasp the controlled device 510 to be operated and its function (desired control operation) based on the figures or characters drawn on the presentation surface 300, and presents, on the position where the function is drawn, the function button of the remote control for controlling the controlled device 510 as an AR object (function button image or the like). At this time, the HMD 100 superimposes, on the presentation surface 300, the AR object and the characters and image printed or described on the presentation surface 300.

In addition, the HMD 100 accepts operations of, for example, selecting, moving, and deleting the function button from the user 901 through gesture actions of the user 901 with respect to the function button, and controls the controlled device.

According to the present embodiment, even if the user 901 loses a remote control, he or she can generate a virtual remote control at any time, and moreover, the virtual remote control only displays functions necessary for the user 901. Furthermore, a paper and the like can be used as the presentation surface 300 serving as the basis of the virtual remote control, and thus it can be attached to a refrigerator and the like. In the case of binding a plurality of such papers like a notebook, it can be used again as necessary. This allows even the user 901 who is very forgetful to control the controlled device 510 easily without finding a remote control.

That is, according to the present embodiment, the user 901 can freely set and generate a virtual remote control including a function button which allows the user 901 to select a desired function so as to realize the selected function.

According to the present embodiment, even if the user 901 does not have a remote control in hand, he or she handwrites a necessary operation on a paper or the like, whereby the written paper functions as a remote control. This does not bother the user 901 to find a remote control. In addition, only a necessary function can be created as a function button, which also does not bother the user 901. Furthermore, the user 901 can arrange the function button as he or she likes, whereby the usability can be improved.

As described above, the present embodiment can eliminate the inconvenience of the user 901 who wants to remotely control a device to find a remote control, whereby the convenience of the user 901 can be greatly improved.

Furthermore, in the present embodiment, the control data table 252 of the controlled device 510 whose virtual remote control has been generated even just once is stored in the data storage of the HMD 100. Using the stored control data enables the controlled device 510 to be controlled without through the network 530 from the next time. This can avoid influence by defect in the network 530 (such as delay caused by malfunction of a network line or disconnection of a line).

On the other hand, in the present embodiment, the remote control table 253 is deleted after its use, and is created again when it becomes necessary next time. This makes unnecessary for the user 901 to find a virtual remote control in the data storage 250 of the HMD 100, and also, suppresses the wasteful memory consumption.

First Modification

In the embodiment described above, in the case where the desired control operations described by the user 901 on the presentation surface 300 include a function that is not provided in the controlled device, the information indicating that the function is not provided may be explicitly shown.

Figure 12A:
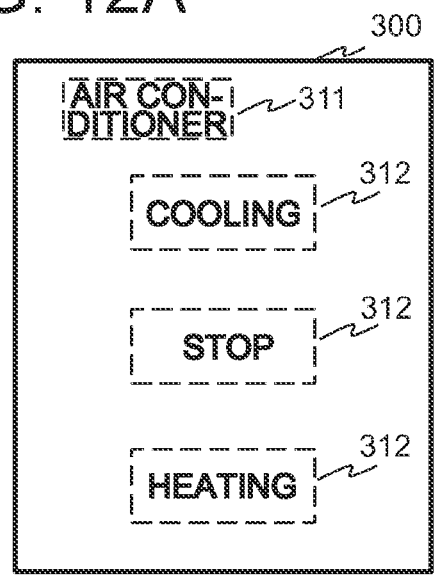
FIG. 12(a) is a diagram for explaining an example of a presentation surface according to a modification of the present invention, and each of FIG. 12(b)
Figure 12B:
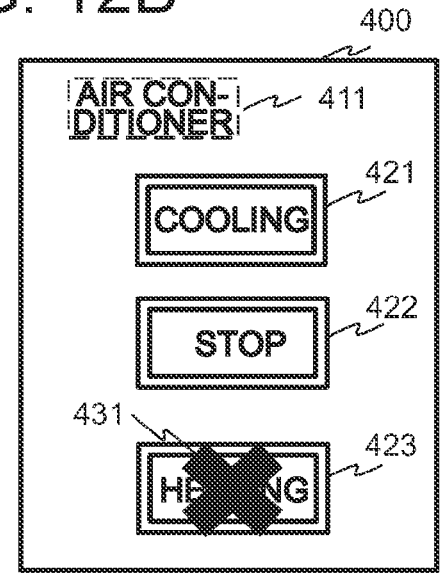
FIG. 12(c) is a diagram for explaining an example of a virtual remote control image according to the modification of the present invention.

FIG. 12(b) illustrates an example of a virtual remote control image in this case. In this example, it is assumed that the user 901 described the desired control operations on the presentation surface 300 as illustrated in FIG. 12(a).

As illustrated in FIG. 12(a), the user 901 writes "air conditioner" as a controlled device name 311, and writes "cooling", "stop", and "heating" as desired control operations 312.

When the controlled device 510 acquired by the identification information acquisition section 222 does not have the function of heating, the control data acquired by the control data acquisition section 223 does not include the control command corresponding to heating. The control data acquisition section 223 notifies the virtual image generation section 225 of that effect.

The virtual image generation section 225 generates and displays the function buttons in association with the control commands of the control operations of "cooling" and "stop" by the method of the embodiment described above. However, with respect to the "heating", the virtual image generation section 225 presents a non-available display 431 indicating that the function is not available in response to the notification from the control data acquisition section 223.

In the example of FIG. 12(b), since the function of "heating" is not available, an AR object provided with a cross mark is created as the non-available display 431 and superimposed on an acceptance object 423 of "heating" and displayed in the virtual remote control image 400. This enables the user 901 to intuitively recognize that the "heating" function cannot be used.

Figure 12C:
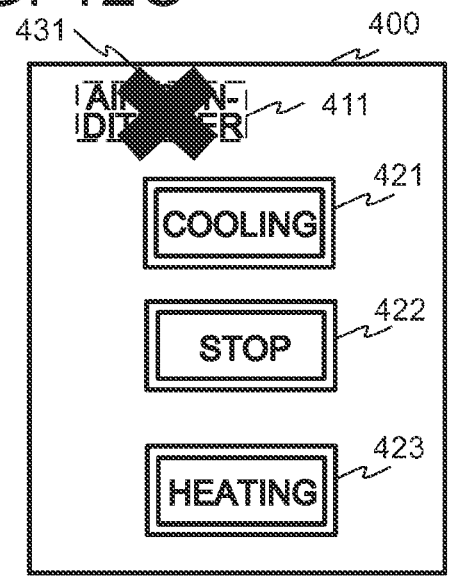

Similarly, in the embodiment described above, in the case where the control data of the controlled device 510 is not present, a message indicating that effect is output, however, the present embodiment is not limited thereto. For example, as illustrated in FIG. 12(c), the user 901 may be notified by the non-available display 431 displayed over the controlled device name 411 of the virtual remote control.

Note that, in the present modification, the AR object of the cross mark is superimposed on the acceptance object and displayed, however, the non-display 431 is not limited thereto. For example, the non-available display 431 may be an AR object of a character string such as "Requested heating function is not available" or "Operable air conditioner cannot be found". These character strings may be output by sound from the speaker 141.

The present modification can reduce unnecessary operations by the user.

Second Modification

In the embodiment above, the example in which the controlled device 510 is an air conditioner has been described, however, the controlled device 510 is not limited to an air conditioner. For example, the controlled device 510 may be a lighting fixture.

Figure 13A:
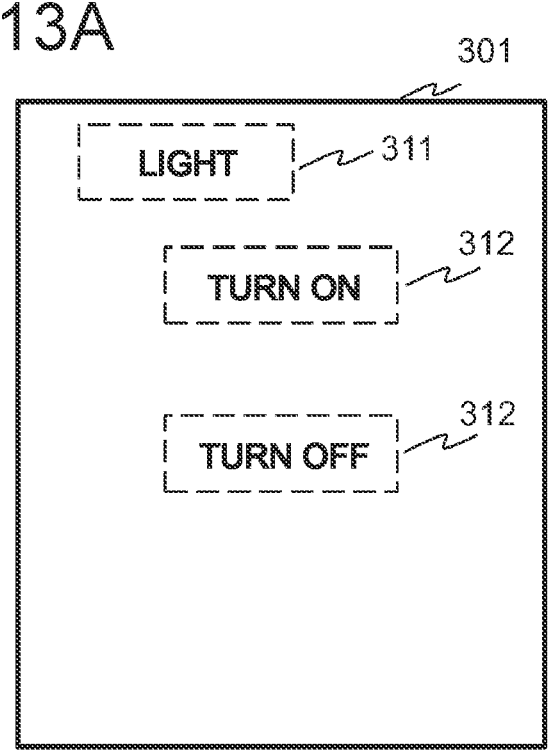
FIG. 13(a) is a diagram for explaining an example of a presentation surface according to a modification of the present invention.
Figure 13B:
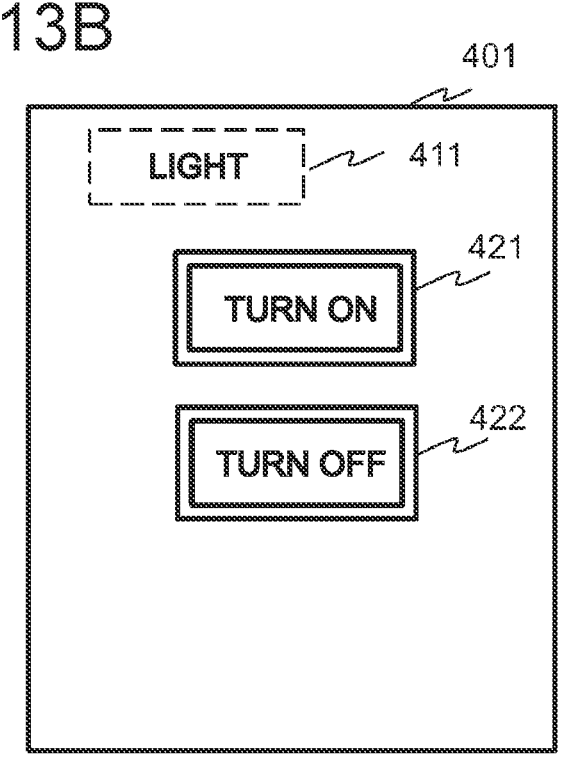
FIG. 13(b) is a diagram for explaining an example of a virtual remote control image according to the modification of the present invention.

FIG. 13(a) illustrates an example of a presentation surface 301 created by the user 901 in the case where the controlled device 510 is a lighting fixture, and FIG. 13(b) illustrates an example of a virtual remote control image 401 created based on analysis of the presentation surface 301 by the HMD 100. As illustrated in FIG. 13(a), the virtual remote control image 401 in which "illumination" is displayed as the controlled device name 411, and "turn on" and "turn off" are displayed as the acceptance objects 421, 422, respectively, is generated based on the description information 310.

Third Modification

Furthermore, in the embodiment described above, a control command is transmitted to the controlled device 510 from the HMD 100 via the network 530. However, the transmission of a control command from the HMD 100 to the controlled device 510 is not limited thereto.

Figure 14:
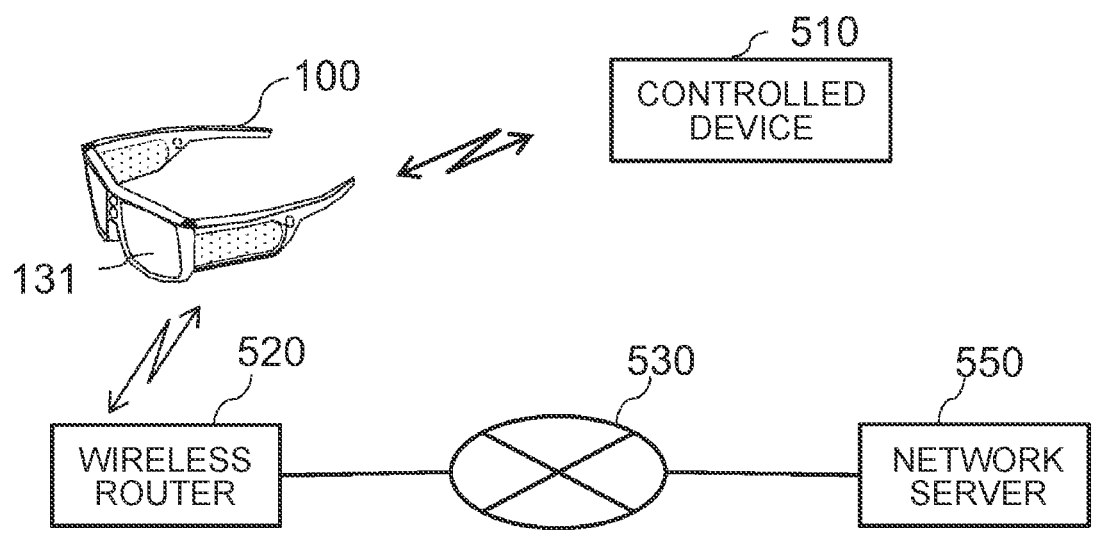
FIG. 14 is a system configuration diagram of a remote control system according to a modification of the present invention.

For example, as illustrated in FIG. 14, a control command may be directly transmitted from the HMD 100 to the controlled device 510 using a near field communication I/F such as infrared communication or Bluetooth. In this case, the command transmitter 240 transmits the control command corresponding to the control operation selected by the user 901 via the BT communication I/F 163 or the infrared communication I/F 164.

According to the present modification, the HMD 100 can control the controlled device 510 using the near field communication I/F without through the network 530. This can make it unnecessary to consider defect in the network 530 (such as delay due to malfunction of a network line or a disconnection of a line).

In this connection, the user 901 may be able to select which communication means is to be used to transmit a control command from the HMD 100 to the controlled device 510.

Fourth Modification

In the embodiment described above, control data of a controlled device is registered in the HMD 100 or acquired from the network server 550 in advance. However, the control data may be acquired from the controlled device 510 per se. In this case, the control data acquisition section 223 accesses the controlled device 510 via either the LAN communication I/F 161, the BT communication I/F 163, or the infrared communication I/F 164 to acquire the control data from the controlled device 510.

In particular, in the case of acquiring the control information via the infrared communication I/F 164, the control data acquisition section 223 may acquire an infrared pattern (data format) generated from a general remote control device for each control operation instead of the control command.

Then, the command transmitter 240 transmits the infrared pattern associated with the operation of the user 901 to the controlled device 510. Thus, outputting an infrared pattern substantially the same as an infrared pattern generated from the normal remote control enables accurate transmission of an instruction.

There are several infrared data formats used in remote controls. For example, NEC format, format of association for electric home appliance, and SONY format are used.

Needless to say, in the present modification, the infrared data format employed by the controlled device 510 is used.

In the case of communication by Bluetooth via the BT communication I/F 163, pairing needs to be performed in advance. If the pairing fails, the user 901 is notified to that effect.

Fifth Modification

Figure 16:
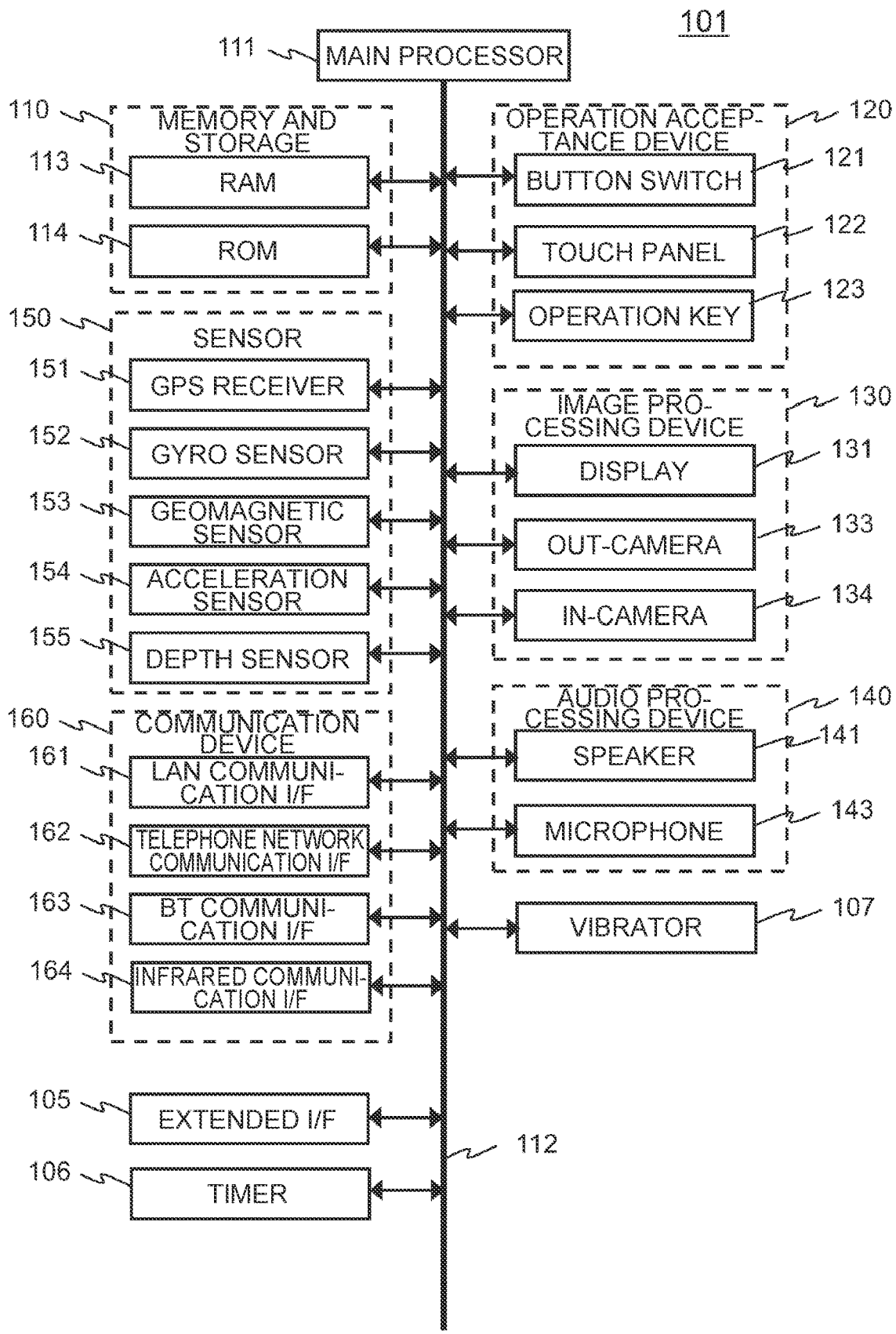
FIG. 16 is a hardware configuration of a smartphone according to an embodiment of the present invention.

In the embodiment described above, the example in which the information processing terminal used by the user 901 is the HMD 100 has been described, however, the information processing terminal is not limited thereto. For example, a mobile information terminal such as a smartphone illustrated in FIG. 16, which further comprises a vibrator 107, or tablet terminal may be used.

FIG. 15 illustrates an outline of the processing by a virtual remote control in the case of using a smartphone and a display example thereof.

As illustrated in FIG. 15, the user 901 holds up the smartphone 101 between the presentation surface 300 and himself or herself, and takes a picture of an area including the description information 310 on the presentation surface 300 to acquire an image of the surroundings.

The smartphone 101 analyzes the surrounding image, identifies the controlled device 510 and the desired control operation, and associates the control command or the infrared format therewith. Then, the smartphone 101 creates the virtual remote control image 400 and displays it on the display 131 of the smartphone 101. Then, upon receiving an operation instruction from the user 901 via the virtual remote control image 400, the smartphone 101 transmits a control command (infrared format) corresponding to the operation instruction to the controlled device 510.

As illustrated in FIG. 15, the generated virtual remote control image 400 includes the controlled device information display area 410 and the desired control operation display area 420. In the example of FIG. 15, the acceptance objects 421, 422 of "cooling" for accepting an instruction to start cooling and "stop" for accepting an instruction to stop are displayed, respectively.

FIG. 15 illustrates a hardware configuration of the smartphone 101 that realizes the above. The hardware configuration of the smartphone 101 basically has the same configuration as that of the hardware of the HMD 100. However, the smartphone 101 is not worn for use by the user 901 like the HMD 100 but is held in hand for use by the user 901. Accordingly, the operation acceptance device 120 of the smartphone 101 is partially different from that of the HMD 100.

The smartphone 101 includes not only the button switch 121 and touch panel 122 but also an operation key 123 as the operation accepting device 120.

The functional configuration of the smartphone 101 for realizing the embodiment described above is basically the same as that of the HMD 100. However, the operation acceptance section 230 of the smartphone 101 does not have to detect and analyze gesture actions to identify the user 901. The operation acceptance section 230 accepts the intention of the user 901 by detecting a touch operation onto the function acceptance button display area of the touch panel 122.

Note that the present modification can be realized not only with a smartphone or a tablet but also with an equivalent or approximate hardware configuration or software configuration. For example, it may be a notebook PC, tablet PC, or the like.

Sixth Modification

In the embodiment described above, the example in which the presentation surface 300 is shaped like a sheet such as a paper has been described. However, the presentation surface 300 is not limited thereto. For example, it may be a whiteboard or the like. The material and shape of the presentation surface 300 are not limited as long as it allows the user 901 to freely write on and take a picture thereof.

The presentation surface 300 may be provided by, for example, a manufacturer of the controlled device 510. For example, it may be a description page of a remote control in a manual or the like. It may be a remote control itself provided for the controlled device 510.

In the case where the description information 310 is prepared in advance, that is, in the case of using, as the presentation surface 300, a manual or a remote control itself which is not created by the user 901, it is not necessary to generate all the acceptance objects of the function buttons on the virtual remote control to be created.

In this case, after analyzing the image of the presentation surface 300 and identifying the control operations, the identification information acquisition section 222 presents the control operations to the user 901 in order to accept the selection of the control operation desired to be displayed on the virtual remote control image 400. Then, the identification information acquisition section 222 identifies, as the desired control operation, the control operation that has been accepted as being selected.

This enables only a desired function of the user 901 to be displayed on the virtual remote control even in the case of using existing information as the presentation surface 300.

Seventh Modification

In the embodiment described above, the identification information acquisition section 222 analyzes the description information 310 to identify characters. At this time, for the analysis, for example, existing character analysis such as an OCR (Optical character recognition) function is used. However, the present embodiment is not limited thereto. For example, handwritten characters by the user 901 are registered in advance so that the characters can be analyzed by a method such as pattern matching with reference to the registration.

Furthermore, only in the case where the handwritten characters by the user 901 cannot be analyzed by the OCR function or the like, the user 901 may be made input digital data so that the handwritten characters and the digital data may be associated with each other and then registered. In this case as well, the registered handwritten characters are used as a pattern in the pattern matching processing at the next presentation surface information acquisition processing for identification of the characters.

Eighth Modification

In the embodiment described above, the example in which, basically, the description information 310 is a character string has been described. However, the description information 310 is not limited to a character string. It may be figures, colors, or the like. In this case, in the analysis table 251, the figures, colors, and the like are registered in advance as the description content 251*a*.

The user 901 may register his or her favorite figures or colors in advance as the ones indicating a specific controlled device 510 and specific desired control operations. This enables the user 901 to generate a virtual remote control even without writing a character.

Instead of the description information 310, a voice or the like may be used. In this case, the voice is registered in the analysis table 251. In other words, the audio data is registered instead of or in addition to the description content 251*a*. The analysis content 251*b* and description type 251*c* are registered in association with the audio data.

Ninth Modification

In the embodiment described above, the displayed virtual remote control image 400 is erased when a predetermined period of time has passed. However, the present invention is not limited thereto. For example, the displayed virtual remote control image 400 may be erased in response to an explicit instruction from the user 901.

Not only displaying of the virtual remote control image 400, but also the remote control table 253 serving as the basis for generation of the virtual remote control image 400 may be erased at the timing that synchronizes with the timing of erase of displaying of the virtual remote control image 400.

Tenth Modification

In the case where the arrangement of the function buttons of the controlled device 510 (arrangement of the function buttons of the remote control) is available from the official site of the manufacturer or the like via the network 530, the arrangement information on the function buttons of the controlled device 510 may be further stored in the data storage 250. Then, the virtual image generation section 225 may generate the virtual remote control image 400 in accordance with the arrangement of the function buttons of the controlled device 510 instead of the arrangement on the presentation surface 300.

The present invention is not limited to the embodiment and modifications described above, and various modifications are possible. For example, a part of an exemplary embodiment may be replaced with a part of other embodiments, and a part of other embodiments may be added to the exemplary embodiment. These modifications belong to the scope of the present invention. Furthermore, the numerical values, messages, and the like appearing in the description and drawings are merely examples, and the effect of the present invention is not impaired even if different ones are used.

Some or all the functions and the like described above may be implemented by hardware, for example, by designing them with an integrated circuitry. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: HMD, 101: smartphone, 105: extended I/F, 106: timer, 107: vibrator, 110: memory and storage, 111: main processor, 112: system bus, 113: RAM, 114: ROM, 115: flash memory, 120: operation acceptance device, 121: button switch, 122: touch panel, 123: operation key, 130: image processing device, 131: display, 133: out-camera, 134: in-camera, 140: audio processing device, 141: speaker, 143: microphone, 150: sensor, 151: receiver, 152: gyro sensor, 153: geomagnetic sensor, 154: acceleration sensor, 155: depth sensor, 160: communication device, 161: LAN communication I/F, 162: telephone network communication I/F, 163: BT communication I/F, 164: infrared communication

210: main controller, 220: virtual remote control generator, 221: image acquisition section, 222: identification information acquisition section, 223: control data acquisition section, 224: association section, 225: virtual image generation section, 230: operation acceptance section, 240: command transmitter, 250: data storage,

251: analysis table, 251*a*: description content, 251*b*: analysis content, 251*c*: description type, 252: control data table, 252*a*: controlled device name, 252*b*: ID, 252*c*: control data, 252*d*: detailed information, 253: remote control table, 253*a*: description type, 253*b*: analysis content, 253*c*: ID, 253*d*: control command, 253*e*: area, 253*f*: display data, 253*g*: creation date and time, 254: gesture action table, 254*a*: gesture action, 254*b*: operation instruction, 255: processing data,

300: presentation surface, 301: presentation surface, 305: outer frame, 310: description information, 311: controlled device name, 312: desired control operation, 400: virtual remote control image, 401: virtual remote control image, 410: controlled device information display area, 411: controlled device name, 420: desired control operation display area, 421: acceptance object, 422: acceptance object, 423: acceptance object, 431: non-available display

500: remote control system, 510: controlled device, 520: wireless router, 530: network, 550: network server, 901: user

The invention claimed is:

1. An information processing terminal including a communication device, which transmits a control command to a controlled device via the communication device to remotely control the controlled device, the information processing terminal comprising:
   a camera configured to acquire a surrounding image which is an image around the information processing terminal;
   an identification information acquisition processor configured to acquire controlled device identification information for identifying a controlled device and desired control operation identification information for identifying a desired control operation to the controlled device, respectively, from a controlled device description and a desired control operation description written on a presentation surface member included in the surrounding image acquired by the camera;

a control data acquisition processor configured to acquire control data on the controlled device using the controlled device identification information acquired by the identification information acquisition processor;

an association processor configured to associate a predetermined control command of a set of control commands for controlling the controlled device included in the control data with the desired control operation identified by the desired control operation identification information;

a virtual remote control generator configured to generate a virtual remote control image including an acceptance object corresponding to the desired control operation identification information;

a display configured to display the virtual remote control image generated by the virtual remote control generator so that the acceptance object corresponding to the desired control operation identification information superimposes on the desired control operation description written on the presentation surface member;

an operation acceptor configured to accept an operation instruction from a user of the information processing terminal; and a command transmitter configured to transmit the predetermined control command, associated with the desired control operation identified by the desired control operation identification information corresponding to the acceptance object, to the controlled device via the communication device, using the operation instruction as an instruction to the acceptance object included in the virtual remote control image, when the operation instruction accepted by the operation acceptor is an instruction corresponding to the desired control operation description written on the presentation surface member.

2. The information processing terminal according to claim 1, wherein
the display is configured to display the virtual remote control image for a predetermined period of time and then erase the virtual remote control image.

3. The information processing terminal according to claim 1, wherein
when the desired control operation identified by the desired control operation identification information is a control operation that the controlled device does not accept, the virtual remote control generator is configured to generate a non-available display, and the display is configured to display the non-available display superimposed on the acceptance object.

4. The information processing terminal according to claim 1, further comprising a memory,
wherein the control data acquisition processor is configured to acquire a control data table, in which the control data is associated with the controlled device identification information, from either the memory, an external server, or the controlled device.

5. The information processing terminal according to claim 1, wherein the communication device comprises at least one of a LAN communication interface and a near field communication interface.

6. The information processing terminal according to claim 1, wherein
the presentation surface member is shaped like a sheet-like member or a whiteboard, and the description is a character or a figure described by the user of the information processing terminal.

7. The information processing terminal according to claim 1, wherein
the information processing terminal is a head-mounted display.

8. The information processing terminal according to claim 1, wherein
the information processing terminal is a smartphone.

9. The information processing terminal according to claim 1, wherein the desired control operation is an operation that the user wants to perform to the controlled device.

10. An information processing terminal including a communication device, which transmits a control command to a controlled device via the communication device to remotely control the controlled device, the information processing terminal comprising:
a memory storing an analysis table and a control data table;
a camera configured to acquire a surrounding image which is an image around the information processing terminal;
an identification information acquisition processor configured to acquire controlled device identification information for identifying a controlled device and desired control operation identification information for identifying a desired control operation to the controlled device, respectively, from a controlled device description and a desired control operation description written on a presentation surface member included in the surrounding image acquired by the camera, using the analysis table;
a control data acquisition processor configured to acquire control data on the controlled device based on the controlled device identification information acquired by the identification information acquisition processor, using the control data table;
an association processor configured to associate a predetermined control command of a set of control commands for controlling the controlled device included in the control data with the desired control operation identified by the desired control operation identification information;
a virtual remote control generator configured to generate a virtual remote control image including an acceptance object corresponding to the desired control operation identification information;
a display configured to display the virtual remote control image generated by the virtual remote control generator;
an operation acceptor configured to accept an operation instruction from a user of the information processing terminal; and
a command transmitter configured to transmit the predetermined control command, associated with the desired control operation identified by the desired control operation identification information corresponding to the acceptance object, to the controlled device via the communication device when the operation instruction accepted by the operation acceptor is an instruction to the acceptance object included in the virtual remote control image.

11. A remote control method for an information processing terminal that includes a communication device and transmits a control command to a controlled device via the communication device to remotely control the controlled device, the remote control method comprising the steps of:

acquiring a surrounding image which is an image around the information processing terminal by a camera of the information processing terminal;

acquiring controlled device identification information for identifying a controlled device and desired control operation identification information for identifying a desired control operation to the controlled device, respectively, from a controlled device description and a desired control operation description written on a presentation surface member included in the surrounding image;

acquiring control data on the controlled device using the controlled device identification information;

associating a predetermined control command of a set of control commands for controlling the controlled device included in the control data with the desired control operation identified by the desired control operation identification information;

generating a virtual remote control image including an acceptance object corresponding to the desired control operation identification information;

displaying the virtual remote control image on a display of the information processing terminal so that the acceptance object corresponding to the desired control operation identification information superimposes on the desired control operation description written on the presentation surface member;

accepting an operation instruction from a user of the information processing terminal; and transmitting the predetermined control command associated with the desired control operation, identified by the desired control operation identification information corresponding to the acceptance object, to the controlled device via the communication device, using the operation instruction as an instruction to the acceptance object included in the virtual remote control image, when the operation instruction from the user is an instruction corresponding to the desired control operation description written on the presentation surface member.

12. An information processing terminal comprising:

a communication interface configured to communicate with a controlled device;

a camera configured to acquire a surrounding image which is an image around the information processing terminal;

an operation acceptor configured to accept an operation instruction from a user of the information processing terminal;

a display;

processing circuitry;

wherein the processing circuitry is configured to:

acquire controlled device identification information for identifying a controlled device and desired control operation identification information for identifying a desired control operation to the controlled device, respectively, from a controlled device description and a desired control operation description written on a presentation surface member included in the surrounding image acquired by the camera;

acquire control data on the controlled device using the controlled device identification information;

associate a predetermined control command of a set of control commands for controlling the controlled device included in the control data with the desired control operation identified by the desired control operation identification information; and generate a virtual remote control image including an acceptance object corresponding to the desired control operation identification information, wherein the display is configured to display the virtual remote control image generated by the processing circuitry so that the acceptance object corresponding to the desired control operation identification information superimposes on the desired control operation description written on the presentation surface member, and wherein the communication interface is configured to transmit the predetermined control command, associated with the desired control operation identified by the desired control operation identification information corresponding to the acceptance object, to the controlled device, using the operation instruction as an instruction to the acceptance object included in the virtual remote control image, when the operation instruction accepted by the operation acceptor is an instruction corresponding to the desired control operation description written on the presentation surface member.

* * * * *